United States Patent [19]

Chiou et al.

[11] Patent Number: 5,369,163
[45] Date of Patent: Nov. 29, 1994

[54] PROCESS FOR PREPARING LARGE DIMENSION EMULSION POLYMER PARTICLES, POLYMER PRODUCT AND USES THEREOF

[75] Inventors: Shang-Jaw Chiou; Miao-Hsun L. Sheng, both of Lower Gwynedd; John W. Hook, III, Warminster; Travis E. Stevens, Ambler, all of Pa.

[73] Assignee: Rohm and Haas Company, Philadelphia, Pa.

[21] Appl. No.: 975,746

[22] Filed: Nov. 13, 1992

[51] Int. Cl.$^5$ ............................................. C08K 3/20
[52] U.S. Cl. .................................... 524/458; 524/460; 524/461; 526/201; 526/203
[58] Field of Search .................. 524/458, 460, 461; 526/201, 203

[56] References Cited

U.S. PATENT DOCUMENTS

| | | | |
|---|---|---|---|
| 4,314,033 | 2/1982 | Gillan et al. | 521/65 |
| 4,743,507 | 5/1988 | Franses et al. | 428/402 |
| 5,106,903 | 4/1992 | Vanderhoff et al. | 524/458 |

FOREIGN PATENT DOCUMENTS 63-98958  4/1988  Japan .

*Primary Examiner*—Paul R. Michl
*Assistant Examiner*—Edward Cain

[57] ABSTRACT

A process for preparing large dimension emulsion polymer particles and the polymer products of the process are disclosed. In one embodiment, the invention provides particles having a high aspect ratio, having a shape described by a long axis and an intersecting short axis. These particles range in shape from egg-like, through rod-like, up to extended filaments. In another embodiment, the invention relates to large, nearly spherical emulsion polymer particles.

23 Claims, 3 Drawing Sheets

PROCESS FOR PREPARING LARGE DIMENSION EMULSION POLYMER PARTICLES, POLYMER PRODUCT AND USES THEREOF

FIELD OF THE INVENTION

The invention relates to large dimension emulsion polymer particles, compositions containing the large dimension emulsion polymer particles and processes of manufacture.

SUMMARY OF THE INVENTION

In one embodiment, the large dimension emulsion polymer particles are high aspect ratio polymers, ranging from particles of 3 to 4 microns in length and 0.3 micron diameter to particles of about 800 microns in length and up to 5–10 microns in diameter. The shapes of these particles range from egg-like to rods to extended strands.

In another embodiment, the large dimension emulsion polymer particles are spherical particles which range in diameter from 2 microns to 40 microns.

In the processes of the invention, large dimension emulsion polymer particles are produced. Both large spherical particles and high aspect ratio emulsion polymer particles can be produced according to the process of the invention. The process involves emulsion polymerization of monomers in an aqueous medium which contains a particle stabilizer system.

In one aspect the invention provides an emulsion polymerization process for preparing large dimension emulsion polymer particles comprising polymerizing at least one ethylenically unsaturated monomer in the presence of i) stabilizer system containing from about 0.5 to 50 weight percent of primary amphiphilic polymeric stabilizer based on the total monomer reactants, and optional organic additive, in which the polymeric stabilizer is selected from the group consisting of hydrophobic-hydrophilic balanced alkaline soluble resin solubilized with organic or inorganic base and hydrophobic-hydrophilic balanced acid soluble resin solubilized by organic or inorganic acid, and;

ii) a free-radical polymerization initiator;

under conditions which favor the continued solubility of the primary amphiphilic polymeric stabilizer, and adding additional monomer in a controlled manner to cause the spherical particles to grow into stabilized large dimension emulsion particles and, optionally, continuing to add monomer to cause the large dimension emulsion particles to grow.

DETAILED DESCRIPTION OF THE INVENTION

Stabilizer System

Figure 1:
FIG. 1 is a transmission optical micrograph (magnification 868x) of high aspect ratio polymer particles prepared according to Example 154.
Figure 2:
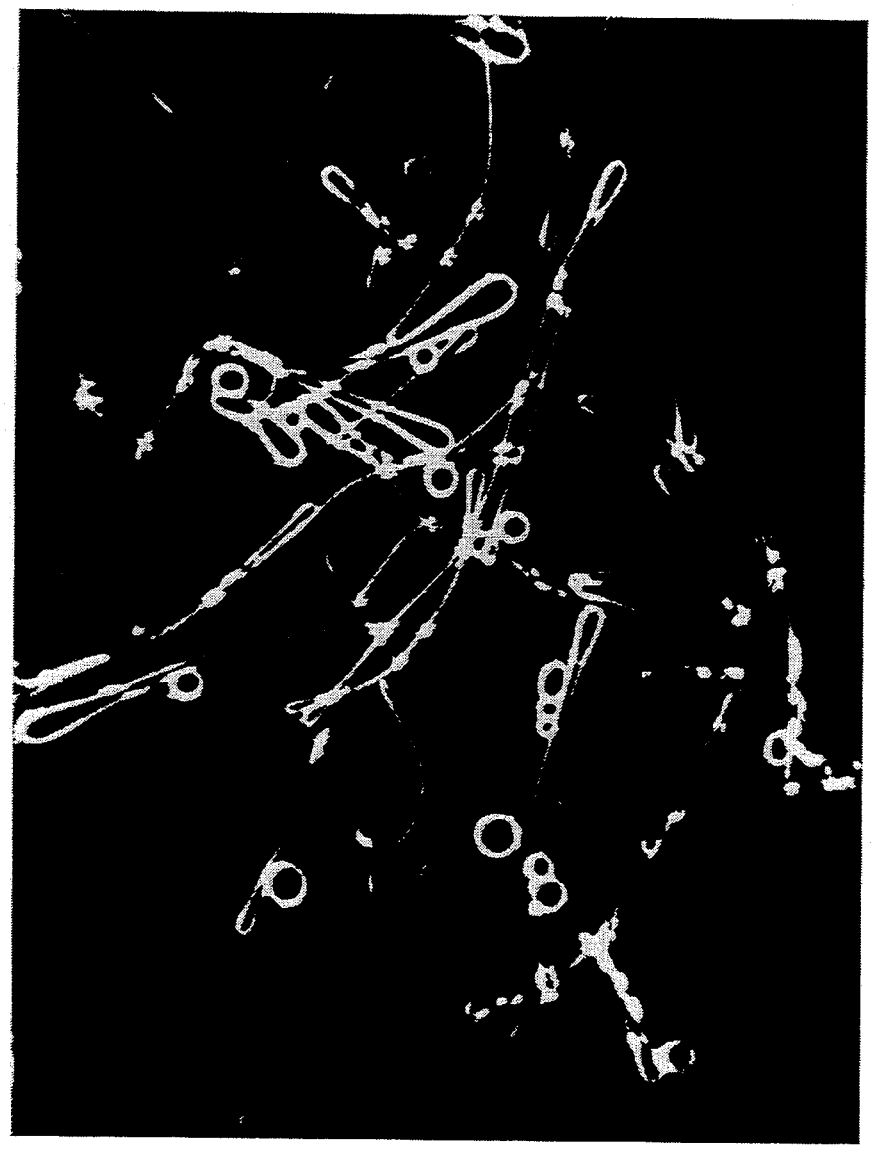
FIG. 2 is a transmission optical micrograph (magnification 868x) of high aspect ratio polymer particles prepared according to Example 6.
Figure 3:
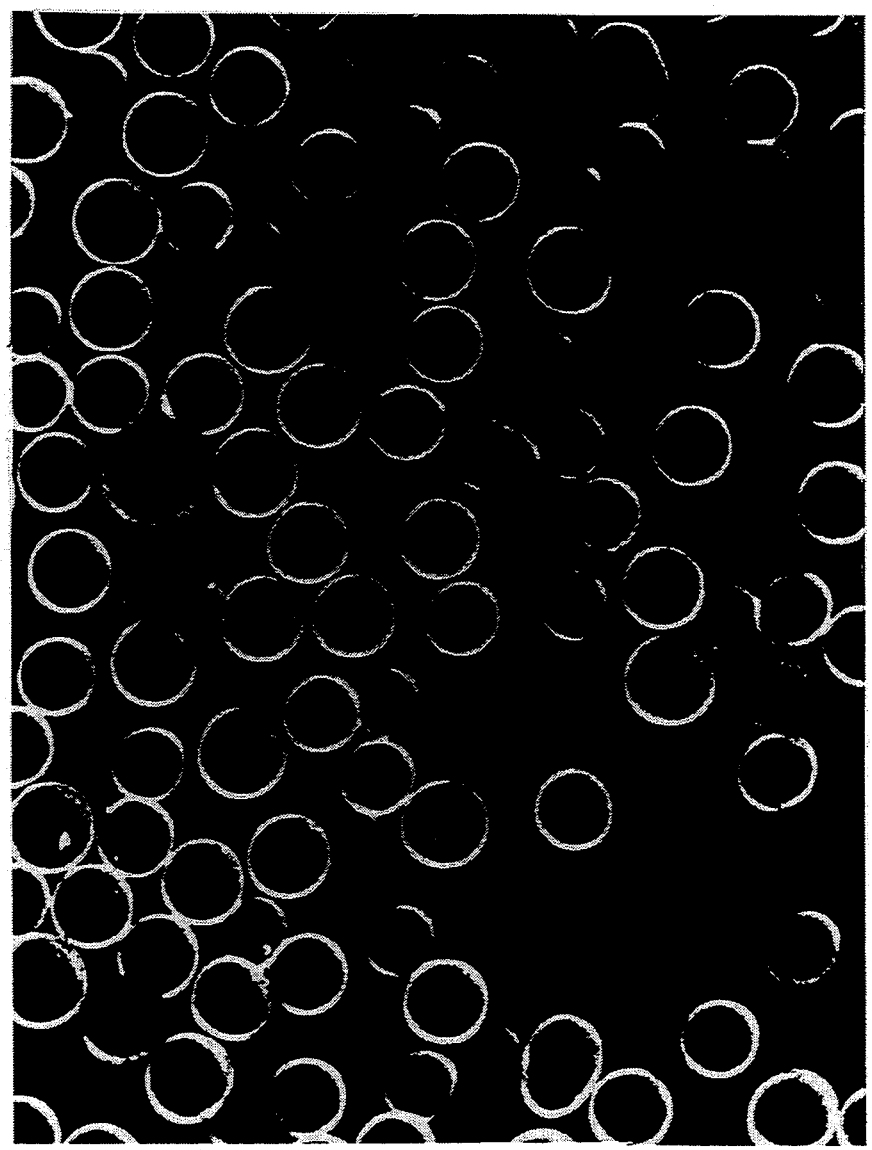
FIG. 3 is a transmission optical micrograph (magnification 868x) of large spherical emulsion polymer particles prepared according to Example 186 (approx. 10 micron diameter).

The process of the invention involves the emulsion polymerization or copolymerization of selected monomers in the presence of a stabilizer system. The stabilizer system contains a primary amphiphilic polymeric stabilizer from one of two classes: alkali-soluble resins and acid-soluble resins, respectively, that contain both hydrophobic and hydrophilic segments. An amphiphilic material is one that contains both hydrophobic and hydrophilic segments covalently bound to the same molecule. Examples of hydrophilic groups include —OH, amido, —O($CH_2CH_2$—O—)$_m$H [m=2 to 70], —COO—$NH_4^+$, —$SO_3$—$Na^+$, and —N(—$CH_3$)$_3^+$-$Cl^-$. Examples of hydrophobic groups include alkyl groups (of the general formula $C_nH_{2n+1}$—) having greater than about 6 carbons to about 20 carbon atoms, such as octyl, nonyl, decyl, undecyl, dodecyl, etc. as well as cyclic (i.e. cyclohexyl) and aromatic groups such as phenyl, tolyl, and arylalkyl groups such as nonylphenyl and t-octylphenyl.

The polymeric stabilizers used in this invention, whether prepared by means of bulk, suspension, solution or emulsion polymerization techniques are all characterized by a balance of hydrophobic and hydrophilic properties.

These polymeric stabilizers can be prepared by typical free radical addition polymerization processes. Bulk, solution, suspension and emulsion polymerization processes are described in "Polymerization Processes", edited by C. E. Schildknecht, John Wiley and Sons, 1977. Preferred are the resins prepared by emulsion and solution polymerization processes. Many conventional pigment dispersants such as Rohm and Haas Company's Tamol®731, a diisobutylene/maleic acid polymer and the styrene/maleic anhydride resins, such as SMA 1000 (MW-1600; acid number 480) available from ARCO Chemical Company, and the like, are examples of commercially available amphiphilic polymeric stabilizers.

The structure and performance properties of the primary polymeric stabilizers are important elements in producing the unique and unexpected particle shapes of this invention. Suitable polymeric stabilizers can be prepared from conventional ethylenically unsaturated and vinyl monomer mixtures that include a high proportion of acid- or amine-functional monomers and that produce, by emulsion or solution polymerization, a polymer product having a molecular weight greater than 1000. The polymeric stabilizer generally has a molecular weight less than 15,000 weight average molecular weight. The preferred molecular weight is from about 5,000 to about 10,000. Polymeric stabilizers of higher molecular weight generally are not preferred as they develop viscosity upon neutralization and may become too insoluble in water to be useful.

The polymeric stabilizer used in the process can generally be prepared from any known polymerizable monomers which are ordinarily used in emulsion and solution polymerization and include, for example, ethylenically unsaturated monomers, aromatic vinyl monomers, acrylic and methacrylic esters having an alkyl group of from 1 to 20 carbon atoms. The functionalities in the polymeric stabilizer can be incorporated through the use of functional monomers in the polymer preparation or through post-polymer functionalization reactions.

The acidic functional monomers of the polymeric stabilizer used in the process are known monomers and include acrylic acid, methacrylic acid, maleic acid, fumaric, crotonic and itaconic acid, sulfonic acid monomers, phosphoric acid monomers, and the like. The alkali-functional monomers which can be used to make the polymeric stabilizer used in the process are known monomers and include N,N-dimethylaminoethyl methacrylate, N,N-dimethylaminoethyl acrylate, N,N-diethylaminoethyl methacrylate, t-butylaminoethyl methacrylate, N,N-dimethylaminopropyl methacrylamide, N,N-dimethylaminopropyl acrylamide, oxazoladinylethyl methacrylate, and the like.

The preferred amount of acid-functional monomers is from about 5 to about 75 weight percent and the preferred amount of alkali-functional monomers is from about 20 to about 70 weight percent, respectively. However, the level of functional monomers required for the formation of rod-shaped or large spherical particles depends significantly on the total composition of the polymeric stabilizers. For example, if chain transfer agents that contain acid- or alkali-functional groups are employed, the proportion of acid- or alkali-functional monomers to be employed should be altered to account for the effect of the groups contributed by the chain transfer agent. The resulting acid-functional or alkali-functional polymeric stabilizer is then solubilized with alkali or acid, respectively, to produce the soluble polymeric stabilizer.

Applicants shall refer to some of the examples, which appear below, to more directly tie the general discussion of the technical effects to some concrete illustrations.

Chain transfer agents (CTAs) are usually required to obtain the preferred 5,000-10,000 molecular weight for the amphiphilic polymeric stabilizer. In addition, the hydrophobic, hydrophilic, associative and steric spacing effects of the chain transfer agents have a profound effect on the formation of large emulsion polymer particles. Examples 16–43 illustrate these effects. Hydrophobic CTAs (Examples 16 and 17) gave 65 BA/35 MMA rod-shaped polymers. Less hydrophobic CTAs (Example 18) gave large spheres, while hydrophilic CTA (3-MPA, Example 22) gave small spheres. Using hydrophobic CTAs such as n-hexadecyl mercaptan, n-octadecyl mercaptan, and benzyl mercaptan, did not give rods (Examples 19, 20 and 21).

With this specific ASR composition, the very hydrophobic n-hexadecyl and n-octadecyl mercaptan and the benzyl mercaptan, which may lead to hydrophobic groups that pack efficiently because of less steric hindrance, may result in polymeric stabilizers that are too hydrophobic to give large polymer particles.

Hydrophilic CTAs like hydroxyethyl mercaptan, mercapto-1,2- propandiol, and 1-mercapto-2-propanol give rods (Examples 23, 24, 25, and 26). We postulate that the hydrophilic OH-containing CTA groups orient along with the charged segment (i.e., poly carboxylic acid), thus diminishing some of the electrostatic forces, and results in hydrophobic-hydrophilic forces balanced enough for rod formation.

The level of hydrophobic CTA, such as n-DDM, in the ASR has an effect on the particle morphology (Examples 31–35). Example 30, which contained only 1% n-DDM, did not form rod-shaped particles; the poor solubility of ASR in Example 30 is believed to be the reason. When excess hydrophilic CTA, HEM or 3-MMP is present (Examples 39 and 43), the ASR polymer chains have electrostatic repulsion force stronger than the hydrophobic interaction since in the low molecular weight ASR, there are fewer BA units per polymer chain. These changes in the balance of hydrophobic-hydrophilic character are believed to be the reason for rod-shaped particles not forming in these examples.

As mentioned above, the type and amount of hydrophilic monomer used and the nature of the CTA used to make the amphiphilic polymeric stabilizer have a pronounced influence on the large emulsion polymer particle produced. The hydrophobicity of the ASR backbone also affects the production of large particles. There is an appreciable increase in the hydrophobicity of alkali-soluble resins as butyl acrylate replaces the less hydrophobic methyl methacrylate. Small amounts of the very hydrophobic monomers such as dodecyl-, hexadecyl- and octadecyl methacrylate have a strong influence on the formation of rod-shaped polymers.

Neutralization of ASR

The neutralizer for the alkali soluble resin used in the process can be selected from the organic and inorganic alkalis and include, for example, sodium hydroxide, potassium hydroxide, lithium hydroxide, ammonium hydroxide, primary, secondary and tertiary amines such as triethylamine and triethanolamine, and quaternary amines. The neutralizer for the acid soluble resins used in the process can be organic and inorganic acids and include, for example, hydrochloric acid, acetic acid, propionic acid, tartaric acid, and the like. The type and amount of neutralizers used in the process is chosen in each case based on the composition of the polymeric stabilizer (ASR), the final emulsion polymer composition, and on the morphology desired.

Triethanol amine is an especially favored alkaline neutralizer for the formation of rod-shaped particles. This may be due to the adsorption of this organic amphiphilic amine along with the polymeric stabilizer in a manner that decreases the mutual repulsion of the ionic heads in the polymeric stabilizer and in this way decreases the electrical work required to form an assembly of particles. Triethanol amine may be used as the sole neutralizing base or in the admixture with other volatile or non-volatile bases.

The degree of neutralization of ASRs, which usually effects the hydrophobic-hydrophilic balance, also effects the shape and size of polymer particles produced. Polymeric stabilizers that are already appreciably hydrophilic by virtue of a high proportion of acid (or amine) functionality are less influenced by the degree of neutralization than are more hydrophobic, less functionalized resins. We observed that when unsolubilized ASR was used, only regular small spherical latex particles were obtained. Rod-shaped particle latexes were obtained once the ASR was neutralized by the base. Some solubility or swelling of the ASR is required to enable the amphiphilic character of the polymeric stabilizer to function in the aqueous phase.

Thus, the structure of the CTA, the amount of CTA used, the vinyl monomers selected, the acid (or amine) content, the solubilizing base (or acid) and the method of preparation are among the variables that affect the balance of hydrophobic interactions and electrostatic repulsions (the amphiphilic character) of these low molecular weight alkali- or acid-soluble resins.

In designing a process, the decision whether to use an acid-soluble or alkali-soluble polymeric stabilizer in the process is based on the pH limits of the polymerization process, especially as determined by the pH requirements for solubility of the ASR. A polymeric stabilizer which is a carboxylic acid-functional resin solubilized by base, may be rendered insoluble by the addition of acidic materials such as acid-functional monomers. Therefore, an acid-soluble resin stabilizer would be the preferred one for manufacture of an acid-functional polymer, as well as for polymers composed of monomers that are unstable under alkaline conditions, such as vinyl acetate-containing polymers. Alkali-soluble resins are preferred polymeric stabilizers for use in the manufacture of amine-functional polymers as well as alkali-stable polymers.

The stabilizer system can also contain other organic additives which influence the morphology of the particles. The organic additives that affect the morphology of latex particles include hydrophobic alcohols, hydrophobic amines, ionic and nonionic surfactants, polyvinyl alcohols and coalescent agents. The presence of hydrophobic alcohols, nonionic surfactants and/or ionic surfactants especially promotes the formation of long rod-shaped latex particles. Preferred hydrophobic alcohols for use in the process are alcohols in which the alkyl group is from about 6 to 18 carbon atoms.

It is taught in the literature, for example, H. Hoffmann, Angew.-Chemie Int. Ed. Engl. 27 902–912 (1988), that small amounts of organic materials, especially amphiphilic alcohol molecules, adsorb at micellar interfaces and may produce marked changes in the Critical Micelle Concentration (CMC) of surfactants. Shorter chain alcohols are adsorbed mainly in the outer portion of the micelle, close to the micelle-water interface, where they may adsorb and desorb quickly. Intermediate chain length alcohols like decanol are believed to be incorporated into the micellar arrangement mainly in the outer portion of the core, and the polymeric stabilizers in the case discussed here are postulated to be located in this area. Adsorption of additives in this way decreases the electrical work required to form an assembly of particles by decreasing the mutual repulsion of the ionic heads in the polymeric stabilizer.

Surfactants useful as part of the stabilizer system in these processes include ionic surfactants; anionics such as sodium lauryl sulfate, sodium dodecylbenzenesulfonate, and the like, when using acid-functional polymer stabilizers, and cationic surfactants when using amine-functional polymer stabilizers. Nonionic surfactants such as ethoxylated alkylphenols and ethoxylated linear and branched $C_{10}$–$C_{18}$ alcohols are also useful. When attempting to make rod-shaped particles composed of polymers of high Tg, it may be desirable to use coalescent or other softening agents to promote the formation of the rod-shaped latex particles. The coalescent agents which can be used in the process include Texanol, xylene, and the like.

The amount of ASR used in this invention generally ranges from 0.5 to 50 weight percent based on the total weight of monomers used to make the polymer particles. Without the use of additives such as ionic and nonionic surfactants, the length of the rod-shaped polymer particles decreases and the diameter of the rods increases as the ASR use level decreases. The polymeric stabilizer can be added to the reaction vessels as a preformed product or can be prepared in situ. The formation of rod-shaped and large spherical latex polymer particles depends on emulsion polymer composition as well as on the polymeric amphiphilic stabilizer and organic additives. We observed that when modifying a process which produces large dimension particles by increasing the Tg of the desired emulsion polymer or increasing the proportion of hydrophobic elements in the emulsion polymer composition, it is advisable to increase the acid content or the proportion of hydrophilic elements in the ASR stabilizer employed in the modified process. Adsorption of a surfactant or stabilizer has been noted to be a function of the hydrophobic part of the stabilizer and the surface of the polymer particles. Usually, the more hydrophobic or non-polar the latex surface, the greater the adsorption of the stabilizer. A more hydrophilic ASR may be needed to counter-balance the strong hydrophobic interactions encountered with hydrophobic polymer compositions.

Emulsion Polymers

The large emulsion polymer particles of this invention are preferably made by conventional emulsion polymerization processes using the appropriate monomers in the proper proportion in an aqueous phase in the presence of the water-soluble stabilizer system, which includes the solubilized amphiphilic polymeric stabilizer, and free-radical generating initiators such as alkali metal persulfates or redox initiator systems such as t-butyl hydroperoxide/sodium metabisulfite. Emulsion polymerization techniques are taught, for example, in U.S. Pat. Nos. 2,754,280, 2,795,564 and 3,732,184 as well as by Gary W. Poehlein in "Encyclopedia of Polymer Science and Engineering", 2nd Ed., Vol. 6, pp. 1–151, John Wiley and Sons, 1986.

Preferably, the process is carried out by adding, under polymerization conditions, the monomer mixture of the composition of the large polymer particle desired which, optionally, may be emulsified in water to an aqueous phase containing the solubilized amphiphilic polymeric stabilizer and, optionally, other suitable anionic, cationic or nonionic emulsifiers or mixtures thereof. Optional organic additives or protective colloids, illustrated by polyvinyl alcohols of various molecular weights and degree of hydrolysis, may also be present.

Suitable monomers which may be polymerized to form the rod-shaped and large spherical particles of this invention include the acrylate and methacrylate monomers such as alkyl acrylates wherein the alkyl group contains from about 1 to about 22 carbon atoms, including methyl acrylate, ethyl acrylate, butyl acrylate, 2-ethylhexyl acrylate, dodecyl acrylate, etc., and alkyl methacrylates, such as methyl methacrylate, ethyl methacrylate, butyl methacrylate, isodecyl methacrylate, dodecyl methacrylate and similar alkyl methacrylates.

Other suitable monomers include acrylonitrile, methacrylonitrile, methylvinyl ether, vinyl acetate, vinyl formate, vinyl versatate, and the like. Other especially preferred monomers include the monovinylidine aromatic monomers such as, for example, styrene, α-methylstyrene, and other substituted styrenes.

Carboxylic acid monomers such as acrylic acid, methacrylic acid, itaconic acid, maleic acid, fumaric acid, crotonic acid, and the like, may also be used. Similarly, amine-functional monomers such as N,N-dimethylaminoethyl acrylate and methacrylate, t-butylaminoethyl methacrylate, N,N-dimethylaminopropyl methacrylamides, and the like, are also readily incorporated into large emulsion polymer particles.

Functional monomers such as glycidyl methacrylate, acetoacetoxyethyl methacrylate, hydroxyethyl methacrylate, hydroxyethyl acrylate, acrylamide, methylolated acrylamide and methacrylamide can be incorporated in these large emulsion polymer particles without difficulty. These functional polymers can be post-crosslinked by known methods to give crosslinked, solvent-resistant large particles. Hydroxyl-containing large polymer particles, including highly functional hydrophilic material, can be prepared by preparing polyvinyl acetate-containing polymers and then hydrolyzing the acetate groups to yield hydroxyl groups.

Conventional chain transfer agents can also be employed in the practice of this invention, and indeed, in many examples, especially with hydrophilic, higher Tg polymers, it is preferable to use amphiphilic chain transfer agents such as n-dodecyl mercaptan. Examples of such conventional chain transfer agents include bromoform, carbon tetrachloride, long chain mercaptans (octyl mercaptan, dodecyl mercaptan), mercapto esters such as methyl mercaptopropionate and 2-ethylhexyl mercaptoacetate and other mercaptans such as mercaptopropionic acid, 2-hydroxyethyl mercaptan, and the like.

The polymerization temperature is in the range of about 30° C. to about 100° C., most preferably from about 55° C. to about 90° C. Polymerization temperatures toward the high end of the range appear to favor the formation of rod-shaped polymer particles. These temperatures may favor the aggregation process postulated as the mode of rod formation. Temperature may also effect the solubility and the amphiphilic balance of the stabilizer system.

Other ingredients known in the art to be useful for specific purposes in emulsion polymerization can be employed in the preparation of these large emulsion polymer particles. For example, appreciable amounts (0.1 to 25%) of water-miscible solvents such as tertiarybutanol, ethanol, methyl Carbitol, butyl Cellosolve, and the like, may be present in the aqueous polymerization medium. Chelating agents may be present to remove metal ions.

During processing of the colloidal dispersions of these large emulsion polymer particles, one must bear in mind that they are stabilized by the solubilized primary polymeric stabilizer. In the case of the alkali soluble resins, for example, a reduction in the pH of the colloidal dispersion to a level that neutralizes the stabilizer will flocculate the dispersion. Similarly, a dispersion of large particles stabilized by an acid-soluble resin will not be stable at the higher pHs that reduce the solubility of the acid-soluble resin. Adjustment of the pH provides a way to flocculate these large polymer particles.

If desired, one may improve or alter the chemical resistance or physical properties of these large particles by conventional second stage polymerizations with conventional monomers and/or crosslinking monomers such as 1,3-butyleneglycol dimethacrylate, allyl methacrylate, trimethylolpropane triacrylate and trimethacrylate, divinyl benzene and the like (see, for example, U.S. Pat. No. 4,814,373, issued Mar. 21, 1989 to Frankel, Jones and Winey).

While not intending to be bound by the theoretical explanation, we provide the following discussion as a guide to those interested in practicing the invention.

We theorize that rod-shaped particles are obtained when the primary polymeric stabilizer, the ASR, has its hydrophobic interaction and electrostatic repulsion forces (hydrophilic interactions) in balance, and that the mechanism of rod or large sphere formation is an aggregation process that occurs when small sized spherical emulsion polymer particles, generated in the presence of the primary polymeric stabilizers, rapidly assemble into rods or spheres. We speculate that rods and spheres form by the same mechanistic process, but that the interactive forces in the stabilizer system may not be as well-balanced when large spheres form. The shape of the large particle produced is apparently controlled by the packing parameters of the amphiphilic stabilizer molecules in the assembly of small particles. In describing large micellar aggregates of different shapes, it has been noted that "one of the fascinating aspects of these systems is the fact that slight changes in the system on a microscopic level can lead to dramatic changes in the macroscopic properties of the system" (H. Hoffmann, Angew. Chem. cited above). In a similar manner, exactly why particular conditions should favor or inhibit the formation of rods or large spheres is not always immediately evident. Independent of the mechanistic theory, the technical effect of the invention is reproducible.

Optical and electron micrographs of samples at stages in the process indicated that small spherical particles formed first in the early stages, and then rod-shaped or large spherical particles formed by coalescence of small spherical particles. The time for first appearance of rod-shaped or large spherical particles varied with both ASR and polymer compositions. Transformation of small spherical particles to rods or large spherical particles occurred rapidly after the appearance of the first large dimension particle. The end product often contained about 70 wt % rods or large spherical particles and about 30 wt % fines (<400 nm). The level of fines at each interval was determined by centrifugation methods. It is suspected that the solubilized ASR (a salt) induces agglomeration of fine particles to rod-shaped or large spherical particles. However, post-adding solubilized ASR to a latex containing fine particles (30–100 nm) prepared from excess ionic surfactants but without any ASR did not produce rod-shaped or large spherical particles; only ~300 nm particles were produced (as shown in Example 173 below). Apparently, incorporation of ASR molecules into the fine particles, i.e., in the early polymerization stage, is necessary for the formation of rod-shaped or large spherical particles.

Not all of the small spherical particles (referred to here as "fines") present at the time of the aggregation process are incorporated into rods or large spheres. Usually, from 10 to 40% fines are present in these preparations in addition to the rods and/or spheres. These fines may be separated from the particles and recycled to the next large particle preparation where they will participate in large particle formation.

The rod-shaped latex particles can be converted to large spherical latex particles by swelling the rod-shaped latex particles with either excess monomers or solvents. High standing monomer levels in the emulsion polymerization process may favor the production of spheres rather than rods.

The solvents which can be used to swell the high aspect ratio particles to form large spherical particles include, for example, hexane, heptane, toluene, xylene, and the like. Nevertheless, the conversion of rods to large spheres by the solvents and excess of monomers depend significantly on the polymer backbone. Highly crosslinked rod-shaped latex particles are unable or unlikely to convert to spheres by either excess solvents or monomers.

Solid Particles

Rod-shaped and large spherical polymer particles in the form of fine powders can be prepared from the rod-shaped and large spherical polymer latexes by removing water and, if necessary, surface active agents (including ASRs), and fine particles from the latexes. The polymer powder can be obtained by various techniques such as filtration, freeze-drying, centrifugal separation, spray-drying, precipitation with organic solvent or by salting-out, and the like.

The diameters and lengths of the large latex particles prepared by this invention include a wide range of dimensions. Preferred diameters of large spherical latex particles are in the ranges of 2 to 40 microns. High aspect ratio particles with diameter from 0.3 to 10 microns, and length up to ~800 microns were prepared. Long particles with an aspect ratio of 3 or greater have been prepared.

Uses

Potential applications for this invention include the use of large spheres as flatting agents and to provide superior burnish resistance to PVC siding, flat and sheen paints, and as the polymerization seed of suspension polymer processes such as ion-exchange beads. Uses for the high aspect ratio particles to provide resistance to mudcracking in pigmented and unpigmented films (especially coatings near or above critical pigment volume concentration over porous substrates), as reinforcing agents in films and plastics, as rheology modifiers, as precursors of carbon rods, and as the basis for non-woven mats and controlled porosity membranes.

EXAMPLES

Fines Determination

To a plastic centrifuge tube was charged 0.5 gram of a latex and approximately 30 grams of water. The mixture was placed in a high speed centrifuge and then spun at 6,000 r.p.m. for 30 minutes to separate the fine particles from particles greater than one micron. The supernatant layer, the layer containing fine particles, was decanted to a weighing pan, and the total non-volatiles were measured after drying the aqueous solution in an oven at 150° C. for two hours. The % fines were then calculated by dividing the total weight of solids in the supernatant layer with the total solid weight (weight of latex times the solid of latex) charged into the centrifuge tube.

Particle Size Determination

The particle size of latexes was determined by an optical microscopy (Zeiss of West Germany).

| Abbreviation of Materials | Full Name of Materials |
| --- | --- |
| ASR | Alkaline soluble resin |
| AA | Acrylic acid |
| MAA | Methyl methacrylic acid |
| IA | Itaconic acid |
| AMPS | 2-acrylamido-2-methyl-1-propanesulfonic acid |
| SMA 1000 | Styrene/Maleic anhydride copolymer |
| BA | Butyl acrylate |
| MMA | Methyl methacrylate |
| EA | Ethyl acrylate |
| EHA | 2-Ethyl hexyl acrylate |
| Sty | Styrene |
| DMAEMA | N,N-Dimethylaminoethyl methaccrylate |
| TBAEMA | N-tert-Butylaminoethyl methacrylate |
| VAc | Vinyl acetate |
| IDMA | Isodecyl methacrylate |
| MLAM | N-Methylol acrylamide |
| GMA | Glycidyl methacrylate |
| AAEM | 2-Acetoacetoxy ethyl methacrylate |
| HEMA | 2-Hydroxyethyl methacrylate |
| ALMA | Allyl methacrylate |
| TEA | Triethanol amine |
| PPA | Propionic acid |
| TTA | Tartaric acid |
| HMPA | 2,2-Bis(hydroxymethyl)-propionic acid |
| VT | Vinyl toluene |
| AN | Acrylonitrile |
| PVOH | Polyvinyl alcohol |
| Airvol 203 | ~88% hydrolyzed PVOH with 7,000–13,000 Number Average Molecular Weight |
| Airvol 205 | ~88% hydrolyzed PVOH with 15,000–27,000 Number Average Molecular Weight |
| Airvol 523 | ~88% hydrolyzed PVOH with 44,000–65,000 Number Average Molecular Weight |
| Conco AAS-60S | Triethanolamine salt of dodecylbenzene sulfonate |
| SLS | Sodium lauryl sulfate |
| DS-4 | Sodium dodecylbenzene sulfonate |
| Alipal CO-436 | Ammonium salt of sulfated polyethoxy nonyl phenol |
| Triton X-405 | Octylphenoxy ethylene oxide (with ~40 EO) |
| Triton X-100 | Oxtylphenoxy ethylene oxide (with ~9–10 EO) |
| CTA | Chain transfer agent |
| n-DDM | n-Dodecanethiol |
| tert-DDM | tert-Dodecanethiol |
| HEM | 2-Mercaptoethanol |
| 3-MMP | Methyl 3-Mercaptopropionate |
| n-C$_8$SH | n-Octanethiol |
| 3-MPA | 3-Mercaptopropionic acid |

-continued

| Abbreviation of Materials | Full Name of Materials |
|---|---|
| TBHP | tert-Butyl hydroperoxide |
| NaBS | Sodium bisulfite |
| SSF (Formopon) | Sodium formaldehyde sulfoxylate ($NaHSO_2 \cdot CH_2O \cdot 2H_2O$) |
| IAA | Isoascorbic acid |
| APS | Ammonium persulfate |
| VAZO 52 | 2,2'-Azobis(2,4-dimethylvaleronitrile) |
| Versene | Ethylene diamine tetraacetic acid tetrasodium salt hydrate |

Example 1

This example illustrates the preparation of an alkali-soluble resin (ASR) for use as a primary polymeric stabilizer.

A 5 liter, four-necked flask equipped with a mechanical stirrer, nitrogen sparge, thermocouple, and condenser was charged with 700 gram of water and 1.7 grams of Alipal CO—436. The kettle solution was heated at 80° C. and seed monomers, 12 grams of butyl acrylate, 12 grams of methyl methacrylate, 12 grams of methacrylic acid, and 1.6 gram of n-dodecanethiol were added and mixed well. Five minutes later, an initiator, 10 grams of ammonium persulfate (APS) dissolved in 100 grams of water, was added. Fifteen minutes later, a monomer emulsion, 488 grams of butyl acrylate, 488 grams of methyl methacrylate, 488 grams of methacrylic acid, 66 grams of chain transfer agent, 1-dodecanethiol, and 6 grams of Alipal CO—436 in 488 grams of water, and an initiator, 5 grams APS dissolved in 100 grams of water, were cofed over a period of two hours while the kettle temperature was maintained at 80° C. The kettle temperature was held at 80° C. for fifteen minutes after the end of the feeds and then cooled to 60° C. A chaser system, 2 grams of ferrous sulfate solution (0.1%), 1 gram of tert-butyl hydroperoxide (TBHP) in 10 grams of water and 0.7 gram of Formopon in 15 grams of water were then added. After completion of the polymerization, the copolymer emulsion was cooled to ambient temperature and filtered through a 100 mesh size screen. The resulting emulsion polymer had total solids of 51.7%, 0.35 gram wet gel, and 1.96 milliequivalents of acid per gram.

Example 2

This example shows the preparation of rod-shaped latex particles from a premade ASR.

One hundred and twenty grams of the above emulsion polymer (Example 1 ), diluted with 500 grams of water was charged to a 5 liter four-necked flask and heated at 68° C. To the kettle was then added 28 grams of triethanolamine to solubilize the first stabilizer, and a mixture of 10 grams of ferrous sulfate solution (0.1% active) and 10 grams of versene solution (1% active). Subsequently, three feeds: (1) a monomer emulsion comprising 300 grams of water, 6.5 grams of Conco AAS-60S (60% active), 325 grams of butyl acrylate, 175 grams of methyl methacrylate, and 0.4 gram of n-dodecanethiol: (2) an initiator, 1.5 gram of TBHP and 1.5 gram of APS dissolved in 50 grams of water; and (3) a reducing agent, 2 grams of sodium bisulfite dissolved in 50 grams of water, were cofed into the kettle over a period of 1.5 hours while the kettle temperature was maintained at 68° C. The resulting polymer contained rod-shaped particles of 0.8 microns in diameter and 50-70 microns in length.

Example 3

This illustrates the preparation of rod-shaped polymer particles with an ASR made in situ.

A 5 liter, four-necked flask equipped with a mechanical stirrer, nitrogen sparge, thermocouple and condenser was charged with 208 grams of water and 0.01 gram of Alipal CO—436. The kettle solution was heated at 80° C. To the kettle was then added 0.6 gram of butyl acrylate, 0.6 gram of methyl methacrylate, 0.6 gram of methacrylic acid, and 0.08 gram of n-dodecanethiol. Five minutes later, a kettle initiator, 0.4 grams of APS dissolved in 20 grams of water was added. Fifteen minutes later, a monomer emulsion containing 19.4 grams of butyl acrylate, 19.4 grams of methyl methacrylate, 19.4 grams of methacrylic acid, 2.32 grams of chain transfer agent, 1-dodecanethiol, and 0.3 gram of Alipal CO—436 in 242 grams of water, and an initiator solution, 0.6 gram APS dissolved in 30 grams of water, were cofed over a period of one hour while the kettle temperature was maintained at 82° C. The kettle temperature was held at 82° C. for fifteen minutes after the end of the feeds.

To the above emulsion polymer (ASR) was then added 32 grams of triethanolamine and a mixture of 10 grams of ferrous sulfate solution (0.1% active) and 10 grams of versene solution (1% active). Subsequently, three feeds, one a monomer emulsion containing 300 grams of water, 6.5 grams of Conco AAS-60S (60% active), 325 grams of butyl acrylate, 175 grams of methyl methacrylate, and 0.4 gram of n-dodecanethiol, the second an initiator, 1.5 grams of TBHP and 1.5 grams of APS dissolved in 50 grams of water, and the third a reducing agent, 2 grams of sodium bisulfite dissolved in 50 grams of water were cofed into the kettle over a period of 1.5 hours while the kettle temperature was maintained at 82° C. Fifteen minutes after the end of the feeds, the kettle was cooled to 63° C. A chaser couple, 1.0 gram of TBHP in 10 grams of water and 1.0 gram of Formopon in 10 gram of water were added thereafter. Fifteen minutes later, the polymer was cooled to ambient temperature. The resulting polymer had 36% of total solids and rod-shaped particles 0.9 microns in diameter, 100-150 microns in length. It also contained fine particles (36 wt % of total latex particles).

Example 4

This example demonstrates an ASR preparation via a one-shot process followed by an in situ preparation of rod-shaped emulsion polymer particles.

A 5 liter, four-necked flask equipped with a mechanical stirrer, nitrogen sparge, thermocouple, and condenser was charged with 300 grams of water and 0.5 gram of Alipal CO—436. The mixture was heated at 80° C., and the monomers, 40 grams of methyl methacrylate, and 20 grams of methacrylic acid, were added along with 2.6 grams of a chain transfer agent 1-dodecanethiol. Subsequently, 0.5 gram of APS initiator dissolved in 10 grams of water was added to the flask. The monomer-containing mixture was held at 80° C. for approximately fifteen minutes. After completion of the polymerization, 14 grams of aqueous ammonia (25 wt %) was added to neutralize (solubilize) the stabilizer. Thus, a clear solution polymer was obtained. To the clear solution polymer was then added a mixture of 10 grams of ferrous sulfate solution (0.1% active) and 10 grams of versene solution (1% active).

Three feeds: (1) a monomer emulsion comprising 325 grams of butyl acrylate, 175 gram of methyl methacrylate, 0.5 gram of n-dodecanethiol, 4 grams of Conco AAS-60S and 250 grams of water; (2) an initiator, 1.0 grams of APS and 1.5 grams of TBHP dissolved in 100 grams of water; and (3) a reducing agent, 1.8 grams of sodium bisulfite dissolved in 100 grams of water were then slowly cofed to the above neutralized polymer over a period of one hour. Mild heat was applied to the flask so that the kettle temperature was maintained at 70° C. The solution was held at 70° C. for fifteen minutes after the end of the feeds and then cooled to 60° C. A chaser couple, 1.0 gram of TBHP in 10 grams of water and 0.7 gram of Formopon dissolved in 15 grams of water were added thereafter. Fifteen minutes later, the polymer was cooled to ambient temperature. The resulting polymer had negligible amounts of gel, 35.6% of total solids and rod-shaped particles 0.9 microns in diameter, 50–70 microns in length.

Example 5

Here, the ASR stabilizer of Example 1 is used to prepare rod-shaped emulsion polymer particles in a gradual addition thermal process.

One hundred and twenty grams of emulsion polymer prepared as Example 1 diluted with 280 grams of water was charged to a 5 liter four-necked flask and heated at 82° C. To the kettle was then added 32 grams of triethanolamine to solubilize the stabilizer, and a mixture of 10 grams of ferrous sulfate solution (0.1% active) and 10 grams of versene solution (1% active). Subsequently, a monomer emulsion containing 250 grams of water, 6.5 grams of Conco AAS-60S (60% active), 325 grams of butyl acrylate, 175 grams of methyl methacrylate, and 0.4 gram of n-dodecanethiol, and an initiator, 2.5 grams of APS dissolved in 50 grams of water, were cofed into the kettle over a period of one hour while the kettle temperature was maintained at 82° C. Fifteen minutes after the end of the feeds, the kettle was cooled to 63° C. A chaser couple, 1.0 gram of TBHP in 5 grams of water and 0.7 gram of Formopon in 10 grams of water were added thereafter. Fifteen minutes later, the polymer was cooled to ambient temperature. The resulting polymer had 45.6% of total solids and rod-shaped particles 1.5 microns in diameter, 20–60 microns in length.

Example 6

This example shows that rod-shaped latex particles can also be prepared from an ASR which was prepared by solution polymerization.

A 5 liter, four-necked flask equipped with a mechanical stirrer, nitrogen sparge, thermocouple, and condenser was charged with 1000 grams of tert-butanol. The kettle was heated at 80° C., and the seed monomers, 16.5 grams of butyl acrylate, 16.5 grams of methyl methacrylate, 17.0 grams of methacrylic acid, and 0.45 gram of chain transfer agent 2-mercaptoethanol were added. Subsequently, 1.0 gram of the free radical initiator VAZO-52 dissolved in 10 grams of tert-butanol was added to the flask. The mixture was held at 80° C. for approximately fifteen minutes. Two mixtures, one containing 313.5 grams of butyl acrylate, 313.5 grams of methyl methacrylate, 317 grams of methacrylic acid and 8.55 grams of 2-mercaptoethanol, and the other containing 10 grams VAZO-52 and 100 grams tert-butanol, were then cofed to the kettle over a period of three hours while the kettle solution was maintained at reflux. Fifteen minutes after feeds were completed, 2 grams of VAZO-52 in 10 grams of tert-butanol as chaser was added. Thirty minutes later, the kettle solution was cooled to 70° C., and then 1 gram of VAZO-52 in 10 grams of tert-butanol was added. Held kettle temperature at 70° C. for one hour and then stripped off tert-butanol using Dean-Stark trap until temperature reached 90° C. To the kettle was then added 530 grams of triethanolamine and two thousand grams of water. Stripping was continued until all tert-butanol was off. The acid content of the resulting solution polymer was 1.277 meq. per gram.

Part of the above solution polymer (7.8 grams), 87 grams of sodium dodecyl benzene sulfonate (23% active) and 200 grams of water were charged to a 5 liter four-necked flask and heated at 80° C. To the kettle was then added a mixture of 10 grams of ferrous sulfate solution (0.1% active) and 10 grams of versene solution (1% active). Subsequently, three feeds, a monomer emulsion comprising 300 grams of water, 4.2 grams of Conco AAS-60S (60% active), 250 grams of butyl acrylate, 250 grams of styrene, and 0.5 gram of n-dodecanethiol, an initiator solution containing 1.5 grams of TBHP and 1.5 grams of APS dissolved in 50 grams of water, and a reducing agent containing 2 grams of sodium bisulfite dissolved in 50 grams of water, were cofed into the kettle over a period of 1.5 hours while the kettle temperature was maintained at 80° C. Fifteen minutes after the feeds were completed, a chaser, 1 grams of TBHP dissolved in 5 grams of water and 0.7 gram of Formopon dissolved in 10 grams of water, were added to chase the residual monomers. The resulting latex had total solids of 33.2% and rod-shaped particle sizes of 2–3 microns in diameter and 40–100 microns in length.

The following summarizes the procedures conducted in Examples 1–6.

| Example | ASR Preparation | ASR Neutr. | Polymer Preparation |
| --- | --- | --- | --- |
| 1 | Grad-add thermal; stock | | |
| 2 | Grad-add thermal; stock | TEA | grad-add redox; 70° C. |
| 3 | Grad-add thermal; in-situ | TEA | grad-add redox; 80° C. |
| 3 | Grad-add thermal; in situ | NH₄OH | grad-add redox; 70° C. |
| 5 | Grad-add thermal; stock | TEA | grad-add thermal; 80° C. |

-continued

| Example | ASR Preparation | ASR Neutr. | Polymer Preparation |
|---|---|---|---|
| 6 | By solution polymerization | TEA | grad-add redox; 80° C. |

Examples 7-13

The procedure was similar to Example 2, except that the ASR neutralizer was altered as shown in Table 1.

TABLE 1

| Example | Type of Neutralizer for ASR | % Neutralized | Shape & Sizes of Particle (d × l, microns) |
|---|---|---|---|
| 7 | Ammonia | 80 | rods: 0.8 × 50-70 |
| 8 | Sodium hydroxide | 80 | rods: 0.8 × 50-70 |
| 9 | Triethylamine | 80 | rods: 0.8-2 × 30-60 |
| 10 | Tripropylamine | 80 | Spheres: 1-7 |
| 11 | N-benzyltrimethyl ammonium hydroxide | 80 | rods: 3.5 × 50-70 |
| 12 | Tris (hydroxymethyl) aminomethane (THAM) | 80 | Rods (60%): 2 × 40-60 Spheres (40%): 3-7 |

The result (Table 1) indicated that all bases used to neutralize 33 BA/33 MMA/34 MMA (4,5 n-DDM) ASR led to rods except tripropylamine (produced spheres), Tripropylamine may be too hydrophobic or too bulky to produce rods with this specific polymeric stabilizer, The type of neutralizer does affect the shape and size of rods.

Examples 13-15

The procedure was similar to Example 2, except that the polymerization temperature were altered as shown in Table 2. Higher polymerization temperature favors formation of rod-shaped polymer particles.

TABLE 2

ASR: 33 BA/33 MMA/34 MAA (4.5 n-DDM)
Polymer: 65 BA/35 MMA (0.1 n-DDM)

| Example | Polymerization Temperature (C) | Shape and Sizes of Particles (microns) |
|---|---|---|
| 13 | 40 | Spheres: 2-7 |
| 14 | 60 | Rods (60%): 0.8 × 40-60 Spheres (40%): 3-8 |
| 15 | 80 | Rods: 0.8 × 50-70 |

Example 16-28

A set of experiments was conducted using one of two processes, A and B, similar to Examples 2 and 3, except that the chain transfer agent used in preparing the ASR was altered as shown in Table 3.

TABLE 3

| Example | Wt % | CTA in ASR Type | Particle shape | Particle Size (d × l, microns) | ASR* Process |
|---|---|---|---|---|---|
| 16 | 4.5 | tert-Dodecyl mercaptan | rod | 0.8 × 40-60 | A |
| 17 | 3.5 | tert-Octyl mercaptan | rod | 1 × 40 & 3-4 × 40 | A |
| 18 | 2.5 | n-Octyl mercaptan | spheres | 15-25 | A |
| 19 | 1.7 | Benzyl mercaptan | clover | 5 | B |
| 20 | 4.5 | Hexadecyl mercaptan | spheres | 0.3 | A |
| 21 | 4.9 | Octadecyl mercaptan | spheres | 0.5 | B |
| 22 | 2.3 | 3-Mercapto propionic acid | spheres | <1 | B |
| 23 | 1.6 | Hydroxy ethyl mercaptan | rod | 0.8 × 40-60 | B |
| 24 | 2.4 | Mercapto-1,2-propandiol | rod | 0.7 × 20-40 | B |
| 25 | 2.1 | 1-Mercapto-2-propanol | rod | 0.7 × 20-40 | B |
| 26 | 2.4 | 3-Mercapto-2-butanol | rod | 0.7 × 80 & 2 × 20 | B |
| 27 | 3.1 | 3-Mercaptoethyl ether | spheres | 15-25 | B |
| 28 | 2.8 | 4-Hydroxythiophenol | spheres | 1 | B |

*A: Using stock ASR (ref. Exampls 1 & 2)
B: Continuous process (ref. Example 3)

As shown in Table 3, the chain-transfer agent (CTA) in ASR (BA/MMA/MAA) has a pronounced effect on the rod-shaped particles formation. Hydrophobic CTAs (Examples 16 and 17) gave 65 BA/35 MMA rod-shaped polymers. Less hydrophobic CTA (Example 18) gave large spheres, while hydrophilic CTA (3-MPA, Example 22) gave small spheres. Using hydrophobic CTAs such as n-hexadecyl mercaptan, n-octadecyl mercaptan, and benzyl mercaptan, did not give rods (Examples 19, 20 and 21).

With this specific ASR composition, the very hydrophobic n-hexadecyl and n-octadecyl mercaptan and the benzyl mercaptan, which may lead to hydrophobic groups that pack efficiently because of less steric hindrance, may result in polymeric stabilizers that are too hydrophobic to give large polymer particles. Hydrophilic CTAs like hydroxyethyl mercaptan, mercapto-1,2-propandiol, and 1-mercapto-2-propanol give rods (Examples 23, 24, 25, and 26). We suspect that the hydrophilic OH-containing CTA groups orient along with the charged segment (i.e., poly carboxylic acid), thus diminishing some of the electrostatic forces, and results in hydrophobic-hydrophilic forces balanced enough for rod formation.

Examples 29-43

The procedure was similar to Example 3, except that the CTA level in the ASR was altered as shown in Table 4.

TABLE 4

ASR Compositions: 33 BA/33 MMA/34 MAA (CTA)

| Example | CTA | % CTA | Rods, | Wt % | Spheres, | Wt % |
|---|---|---|---|---|---|---|
| 29 | None | — | — | | <1u, | 100% |
| 30 | n-DDM | 1.0 | — | | <2u, | >90% |
| 31 | n-DDM | 2.0 | 1 × 50 u, | 70% | 2-4u, | 30% |
| 32 | n-DDM | 4.0 | 1 × 50-90u, | 80% | 2-4u, | 20% |
| 33 | n-DDM | 8.0 | 1 × 30-90u, | 80% | 2-4u, | 20% |
| 34 | n-DDM | 12.0 | 2 × 30-70u, | 80% | 2-4u, | 20% |
| 35 | n-DDM | 16.0 | 2 × 40-100u, | 80% | 2-4u, | 20% |
| 36 | HEM | 0.8 | 1 × 30u, | 30% | 3u, | 70% |
| 37 | HEM | 1.55 | 1 × 100u, | 80% | 4u, | 20% |
| 38 | HEM | 3.1 | 1 × 100u, | 70% | 5u, | 30% |
| 39 | HEM | 4.7 | 1 × 100u, | 10% | 10u, | 90% |
| 40 | 3-MMP* | 1.3 | 1 × 100u, | 60% | 10u, | 40% |
| 41 | 3-MMP* | 2.7 | 1 × 100u, | 80% | 10u, | 20% |
| 42 | 3-MMP* | 5.4 | 1 × 100u, | 40% | 25u, | 60% |
| 43 | 3-MMP* | 8.10 | 0 | | <1u, | 100% |

*Polymers contained 2% of decanol (based on total monomers).

The data in Table 4 shows that the level of hydrophobic CTA, such as n-DDM, in the ASR has an effect on the particle morphology (Examples 31-35). Example 30, which contained only 1% n-DDM, did not form rod-shaped particles; the poor solubility of ASR in Example 30 is believed to be the reason. When excess hydrophilic CTA, HEM or 3-MMP, is present (Examples 39 and 43), the ASR polymer chains have electrostatic repulsion force stronger than the hydrophobic interaction since in the low molecular weight ASR, there are fewer BA units per polymer chain. These changes in the hydrophobic-hydrophilic balancing character are believed to be the reason for rod-shaped particles not forming in these examples.

Examples 44-52

The procedure was similar to Example 3, except that the ASR compositions were altered as shown in Table 5.

TABLE 5

| Example | ASR Composition | CTA in ASR | Shape & Size of Particles (microns) |
|---|---|---|---|
| Polymer composition: 65 BA/35 MMA | | | |
| 44 | 33 BA/33 MMA/34 MAA | n-octyl mercaptan | Spheres: 15-25 |
| 45 | 42 BA/25 MMA/33 MAA | " | Rods: 2 × 40 |
| 46 | 55 BA/12 MMA/33 MAA | " | Spheres: 4-9 |
| 47 | 33 BA/33 MMA/34 MAA | 3-MMP | Spheres: 7-24 |
| 48 | 50 BA/17 MMA/33 MAA | " | Rods: 2 × 40 |
| Polymer composition: 70 BA/30 MMA | | | |
| 49 | 36.2 BA/26.3 MMA/37.5 MAA | 3-MMP | Rods (60%): 3 × 60 Spheres (40%): 4-12 |
| 50 | 62.5 BA/37.5 MAA | " | Rods: 1 × 60 |
| 51 | 36.2 BA/26.3 MMA/37.5 MAA | n-DDM | Rods: 2 × 36 |
| 52 | 62.5 BA/37.5 MAA | " | Rods: 0.8 × 80 |

Table 5 shows that in addition to the hydrophobic groups (CTAs) at the end of polymer chains, the hydrophobicity of the ASR backbone affects the formation of rod-shaped particles in a similar manner. As the amount of BA in both n-octyl mercaptan and 3-MMP terminated ASRs increased, the hydrophobicity of ASR also increased, and once the forces between the hydrophobic interaction and the electrostatic repulsion were in balance, rod-shaped particles formed (Examples 44, 45, 47, 48, 49, and 50). However, when the ASR became too hydrophobic, the rods disappeared (Example 46). The backbone hydrophobicity in n-DDM terminated ASRs affected the size of the rod-shaped particle more than the particle shape (Examples 51 and 52).

Examples 53-55

The procedure was similar to Example 7, except that the ASR Levels were altered as shown in Table 6.

TABLE 6

Effect of ASR Level on Size of Rods
ASR: 65 MMA/35 MAA (4.5 n-DDM)
Emulsion Polymer: 65 BA/35 MMA

| Example | Wt % ASR* | Rod Size (microns) |
|---|---|---|
| 53 | 12 | 0.8 × 35 |
| 54 | 4 | 1.5 × 30 |
| 55 | 2.4 | 2.5 × 16 |

*Based on Emulsion Polymer monomers

Table 6 shows the effect of ASR level on the size of rod-shaped particles. The length of rods decreased and the diameter of rods increased progressively as the ASR use level decreased. However, long rods can be prepared in the presence of low levels of ASR and other ionic surfactants (see Examples 100 to 111 below).

Examples 56-62

The procedure was similar to Example 2, except that the degree of ASR neutralization was altered as shown in Table 7.

The degree of neutralization of ASRs also affected the size and shape of the polymer particle produced. However, the more MAA in the ASR, the less the effect of the degree of neutralization. Apparently, solubilization of the ASR affects the hydrophobe-hydrophile balance. It is well known that less base is needed to solubilize the higher acid containing (more hydrophilic) ASRs. Only regular small spherical latex particles were obtained from unsolubilized ASR (see Table 7). Rod-shaped particle latexes were obtained once the ASR was solubilized by the base.

Example 63–83

The procedure was similar to Examples 2 and 3, except that ASRs contained hydrophobic monomers as shown in Table 8.

Incorporating hydrophobic monomer into hydrophilic chain-transfer agent terminated ASRs promoted the formation of rod-shaped particles.

TABLE 7

| Example | ASR Composition | Degree of Neutralization | Polymer Composition | Shape and Size Particles (microns) |
|---|---|---|---|---|
| 56 | 33 BA/17 MMA/50 MAA/4 n-DDM | 0% | 30 BA/70 Sty/0.1 n-DDM | spheres: 0.2–0.4 |
| 57 | " | 39% | " | spheres: 1–2 with few 1 × 100 um rods |
| 58 | " | 58% | " | rods: 1–2 × 100 |
| 59 | " | 90% | " | rods: 1–2 × 50–100 |
| 60 | 33 BA/33 MMA/34 MAA/4.5 n-DDM | 60% | " | spheres: <1 |
| 61 | " | 90% | " | rods: 0.8 × 50–70 |
| 62 | " | 100% | " | rods: 0.8 × 50–70 |

TABLE 8

Polymer Composition: 65 BA/35 MMA (0.08 n-DDM)

| Example | ASR Composition | Shape and Size of Particles (microns) |
|---|---|---|
| 63 | 32 BA/32 MMA/34 MAA/2 Octadecyl acrylate (2.0 nDDM) | Mostly rods: 1 × 10–70 |
| 64 | 32 BA/32 MMA/34 MAA/2 Octadecyl acrylate (4.0 nDDM) | Mostly rods: 1 × 10–90 |
| 65 | 32 Ba/32 MMA/34 MAA/2 Lauryl acrylate (2.4 MMP) | Large spheres: 7–12 |
| 66 | 31 BA/31 MMA/34 MAA/4 Lauryl acrylate (2.4 MMP) | Mostly rods: 1 × 60–180 |
| 67 | 29 BA/29 MMA/34 MAA/8 Lauryl acrylate (2.4 MMP) | Large spheres: 2–6 |
| 68 | 25 BA/33 MMA/34 MAA/8 Lauryl acrylate (2.4 MMP) | Rods: 1 × 55–120 |
| 69 | 33 EA/37 MMA/25 MAA/5 Lauryl acrylate (2.4 MMP) | Large spheres: 10–25 |
| 70 | 23 EA/37 MMA/25 MAA/15 Lauryl acrylate (2.4 MMP) | Large spheres: 5–35 |
| 71 | 31 BA/31 MMA/34 MAA/4 Lauryl methacrylate (2.4 MMP) | Rods: 1 × 30–90 (80%); Spheres: 3–8 (20%) |
| 72 | 28.6 BA/28.6 MMA/32.4 MAA/5.7 IDA/4.7 LA (2.4 MMP) | Rods: 1 × 50–120 |
| 73 | 32 BA/32 MMA/34 MAA/2 cetyl methacrylate (2.4 MMP) | Rods: 1 × ~60 (30%); Spheres: 6–15 (70%) |
| 74 | 31 BA/31 MMA/34 MAA/4 cetyl methacrylate (2.4 MMP) | Rods: 3 × 30 (40%); Spheres: 6–12 (60%) |
| 75 | 29 BA/33 MMA/34 MAA/4 cetyl methacrylate (2.4 MMP) | Mostly rods: 1 × 40–120 (60%) |
| 76 | 32.5 BA/32.5 MMA/34 MAA/1 octadecyl acrylate (2.4 MMP) | Large spheres: 5–16 |
| 77 | 32.0 BA/32.0 MMA/34 MAA/2 octadecyl acrylate (2.4 MMP) | Rods: 1 × 40–200 |
| 78 | 31.0 BA/31.0 MMA/34 MAA/4 octadecyl acrylate (2.4 MMP) | Rods: 1 × 40–200 (80%); Spheres: 3–7 (20%) |
| 79 | 31 BA/31 MMA/34 MAA/4 IDMA (2.4 MMP) | Mostly fines & large Spheres: 3–20 |
| 80 | 30.5 BA/30.5 MMA/34 MAA/5 IDMA (2.4 MMP) | Rods: 1 × 25–145, mostly 1 × ~120 |
| 81 | 30 BA/30 MMA/34 MAA/6 IDMA (2.4 MMP) | Rods: 1 × 30–100 (30%); Spheres: ~6 (70%) |
| 82 | 27 BA/33 MMA/34 MAA/6 IDMA (2.4 MMP) | Rods: 1 × 30–80 (85%); Spheres: 3–8 (15%) |
| 83 | 29 BA/29 MMA/34 MAA/8 IDMA (2.4 MMP) | Large spheres: 4–10 |

TABLE 9

Effect of Additives

| Example | ASR Composition | wt % ASR | Second Stage Polymer Composition | Additives* | Shape and Size of Particles (microns) |
|---|---|---|---|---|---|
| 84 | 33 BA/33 MMA/34 MAA/2.5 C$_8$SH | 12 | 65 BA/35 MMA/0.1 n-DDM | None | spheres: 15–20 |
| 85 | " | 12 | " | 2.0 decanol | rods: 1–1.5 × 30–60 |
| 86 | 33 BA/33 MMA/34 MAA/2.7 3-MMP | 12 | 65 BA/35 MMA/0.1 n-DDM | None | spheres: 7–24 |
| 87 | " | 12 | " | 0.6 butanol** | spheres: 9–15 |
| 88 | " | 12 | " | 0.8 hexanol** | spheres: 20–30 |
| 89 | " | 12 | " | 1.0 octanol** | rods: 1 × 60-90 & spheres: 15–25 |
| 90 | " | 12 | " | 1.2 decanol** | rods: 2 × 50–70 |
| 91 | " | 12 | " | 1.4 dodecanol** | rods: 1 × 70–90 |
| 92 | " | 12 | " | 0.6 decanol | spheres: 15–30 |
| 93 | " | 12 | " | 2.4 decanol | rods: 1–1.5 × 70–90 |
| 94 | " | 12 | " | 2.4 butanol | spheres: 12–25 |
| 95 | 65 MMA/35 MAA (4.5 n-DDM) | 12 | 50 BA/50 MMA/0.1 n-DDM | None | spheres: <1 |
| 96 | " | 12 | " | 2.0 decanol | mix rods: 3 × 40 & 0.8 × 60 |
| 97 | 33 BA/22 MMA/45 MAA/4 n-DDM | 12 | 100 Sty/0.1 n-DDM | 2 decanol, | rods: 1.5 × 10–40 |

TABLE 9-continued

| | | | Effect of Additives | | |
|---|---|---|---|---|---|
| Example | ASR Composition | wt % ASR | Second Stage Polymer Composition | Additives* | Shape and Size of Particles (microns) |
| 98 | " | 12 | " | 10 Texanol 2 decanol, 10 xylene | rods: 1.5 × 10-25 |
| 99 | " | 12 | " | 2.0 decanol | spheres: <1 |
| 100 | 33 BA/33 MMA/34 MAA/4.5 t-DDM | 1 | 65 BA/35 MMA/0.1 n-DDM | 1.5 SLS | rods: 2 × 200 |
| 101 | " | 1 | " | 4.0 × X-165 | spheres: 10-15 & a few short rods |
| 102 | 33 BA/33 MMA/34 MAA (3.5 n-C$_8$SH) | 1 | " | 3.0 SLS | rods: 2 × 200 |
| 103 | 33 BA/33 MMA/34 MAA (4.5-DDM) | 2 | " | 3.0 SLS | rods: 2 × 300 |
| 104 | " | 1 | " | 1.0 SLS | spheres: 6-15 |
| 105 | " | 1 | " | 0.5 SLS | spheres: 6-10 |
| 106 | " | 1 | " | 3.0 SLS | rods: 2 × 300 |
| 107 | " | 1 | " | 3.0 DS-4 | rods: 2 × 300 |
| 108 | " | 1 | " | 3.0 Alipal CO-436 | rods: 2 × 150 & spheres: ~5 |
| 109 | " | 0.5 | " | 0.75 SLS | rods: 4 × 50-100 |
| 110 | " | 2 | 40 BA/60 Sty | 3.0 SLS | rods: 2 × 200 |
| 111 | " | 2 | 40 BA/60 MMA | 3.0 SLS | rods: 2 × 200 |

Examples 112–153

Table 10 shows that monomers such as EA, EHA and styrene also gave rod-shaped or large spherical latex particles. In general, EHA or styrene containing ASRs produce shorter rods. A variety of functional monomer containing rod-shaped latex particles were obtained as shown in Table 10. Crosslinked rod-shaped latex particles also can be prepared. As shown in Table 10, ASRs based on monomers other than MAA, such as AA, AMPS and maleic acid, can also give rod-shaped or large spherical latex particles.

TABLE 10

| Example | ASR Composition | Polymer Composition | Stabilizers | Neutralizer | Particles (microns) |
|---|---|---|---|---|---|
| 112 | 33 EA/42 MMA/25 MAA (2.4 MMP) | A | 12 ASR/.8 hexanol | ammonia | spheres: 25 |
| 113 | 33 EA/42 MMA/25 MAA (6.0 DDM) | " | 12 ASR/1.2 hexanol | ammonia | rods: 0.8 × 50 (40%); 2-4 × 10-20u (60%) |
| 114 | 33 EA/12 MMA/55 MAA (4.0 nDDM) | " | 12 ASR/1.3 decanol | TEA | spheres: <0.6 |
| 115 | 33 EA/10 styrene/2 MMA/55 MAA (4.0 nDDM) | " | 12 ASR/1.3 decanol | ammonia | rods: 0.3 × 10 |
| 116 | 33 BA/27 MMA/40 MAA (3.6 MMP) | " | 12 ASR/1.3 decanol | TEA | spheres: 9-12 |
| 117 | 33 BA/27 MMA/40 MAA (4.0 nDDM) | " | 12 ASR/1.9 decanol | TEA | rods: 1 × 100 (60%); spheres: 6-10 (40%) |
| 118 | 33 EHA/10 styrene/17 MMA/40 MAA (4.0 nDDM) | " | 12 ASR/1.2 hexanol | ammonia | rods: 0.25 × 3-4 |
| 119 | 33 EHA/10 styrene/32 MMA/25 MAA (4.0 nDDM) | " | 12 ASR/1.3 decanol | ammonia | spheres: <1 |
| 120 | 33 EA/42 MMA/25 MAA (2.4 MMP) | B | 12 ASR/1.9 decanol | ammonia | rods: 0.8-4 × 20-80 (70%); spheres: 10-15 (30%) |
| 121 | 33 EA/12 MMA/55 MAA (4.0 nDDM) | " | 12 ASR/0.8 hexanol | TEA | rods: 1 × 80 (85%); spheres: 5-8 (15%) |
| 122 | 33 EA/27 MMA/40 MAA (4.0 n-DDM) | " | 12 ASR/1.9 decanol | ammonia | rods: 0.6 × 3-10 |
| 123 | 33 EA/10 styrene/32 MMA/25 MAA (2.4 MMP) | " | 12 ASR/1.3 decanol | TEA | spheres: 7-20 |
| 124 | 33 BA/27 MMA/40 MAA (4.0 nDDM) | " | 12 ASR | TEA | rods: 2 × 70 |
| 125 | 33 BA/42 MMA/25 MAA (2.4 MMP) | " | 12 ASR/0.8 hexanol | TEA | spheres: 2-10 |
| 126 | 33 BA/10 styrene/17 MMA/40 MAA (4.0 nDDM) | " | 12 ASR/1.2 hexanol | ammonia | rods: 1.5 × 20-50 (70%); spheres, 2-5 (30%) |
| 127 | 33 EHA/12 MMA/55 MAA 92.4 MMP) | " | 12 ASR/1.9 decanol | ammonia | spheres: <1 |
| 128 | 30 BA/45 MMA/15 HEMA/10 MAA/4.5 n-DDM | C | 10 ASR | TEA/ ammonia | spheres: ~1 |
| 129 | 30 BA/45 MMA/15 HEMA/10 MAA/4.5 n-DDM | " | 4 ASR/6 SLS | Ammonia | rods (50%): 2 × 50-100; spheres (50%): 5-12 |
| 130 | 30 BA/45 MMA/15 HEMA/10 MAA/4.5 n-DDM | " | 2 ASR/3 SLS | Ammonia | spheres: 6-18 |
| 131 | 30 BA/40 MMA/25 HEMA/5 MAA/4.5 n-DDM | " | 2 ASR/3 SLS | Ammonia | mostly small spheres <1 |
| 132 | 30 EA/40 MMA/25 HEMA/5 MAA/4.5 n-DDM | " | 2 ASR/3 SLS | Ammonia | spheres: 25-50 |

| Example | ASR Composition | Polymer Composition | Stabilizers | Particles (microns) |
|---|---|---|---|---|
| 133 | 33 BA/33 MMA/34 MAA/4.5 n-DDM | 100 BA | 12 ASR | rods: 0.8 × 10-20 |
| 134 | 33 BA/33 MMA/34 MAA/4.5 n-DDM | 100 MMA | 12 ASR | spheres: <1 |
| 135 | 33 BA/33 MMA/34 MAA/4.5 n-DDM | 86 EA/14 MMA | 12 ASR | rods: 2 × 20-40 |
| 136 | 33 BA/33 MMA/34 MAA/4.5 n-DDM | 45 BA/55 EA | 12 ASR | rods: 2 × 20-30 |
| 137 | 33 BA/33 MMA/34 MAA/4.5 n-DDM | 93 BA/7 AN | 2 ASR/2 DS-4 | rods: 2 × 50-100 |
| 138 | 33 BA/33 MMA/34 MAA/4.5 n-DDM | 20 (65 BA/35 MMA/0.1 n-DDM)// 80 (65 BA/27.5 MMA/7.5 TBAEMA)* | 12 ASR | rods: 3 × 80-165 |
| 139 | 33 BA/33 MMA/34 MAA/3.5 n-C$_8$SH | 34 BA/60 Sty/4 EA/3 ALMA | 12 ASR | spheres: 9-15 |
| 140 | 33 BA/27 MMA/40 MAA/4 n-DDM | 50 BA/40 MMA/10 AAEM/0.1 n-DDM | 12 ASR/ 2 decanol | rods: 1.5 × 100-150 |
| 141 | 33 BA/22 MMA/45 MAA/4 n-DDM | 100 VT//3 DVB* | 5 ASR/ 2 SLS/ | rods: 2 × 40-100 |

TABLE 10-continued

| | | | 4 Xylene | |
|---|---|---|---|---|
| 142 | 25 BA/75 MAA/4.5 n-DDM | 65 BA/35 MMA/0.1 n-DDM | 10 ASR | spheres: 3–5 |
| 143 | 73 MMA/27 MAA/4.5 n-DDM | 60 BA/38 MMA/2 DMAEMA | 5 ASR | rods: 4 × 50–100 |
| 144 | 65 MMA/35 MAA/4.5 n-DDM | 65 BA/35 MMA | 12 ASR | rods: 0.9 × 50–70 |
| 145 | 50 MMA/50 MAA/4 n-DDM | 20 BA/80 VOAc | 15 ASR | rods: 1 × 7–18 |
| 146 | 25 BA/50 MLAM/25 MAA (4.0 n-DDM) | 46 BA/54 MMA | 2 ASR/ 2 SLS/ 4 decanol | rods: 1 × 90 |
| 147 | 40 BA/35 MLAM/25 MAA | 50 BA/50 EA | 2.0 ASR/4 SLS | rods: 1 × (15–30) |
| 148 | 40 BA/35 MLAM/25 MAA | 49.75 BA/49.75 EA//0.5 IA* | 0.5 ASR/4 SLS | rods: 4 × (20–40), some small spheres |
| 149 | 40 BA/35 MLAM/25 MAA | 48BA/48EA//1 MAA/3 MLAM* | 0.5 ASR/4 SLS | rods (90%): 1 × 20, spheres (10%): 2–5 |
| 150 | 30 BA/70 AMPS/3 n-DDM | 65 BA/35 MMA/0.1 n-DDM | 8 ASR | spheres: 6–8 |
| 151 | 33 BA/33 MMA/33 AA/4 n-DDM | 50 BA/50 Sty | 2.4 ASR/4 SLS | rods: 2–3 × 50–90 |
| 152 | SMA 1000 | 50 BA/50 Sty | 2 ASR/3 SLS | rods: 2 × 50–100 |
| 153 | SMA 1000 | 65 BA/35 MMA | 2 ASR/3 SLS | spheres: 10–18 |

Examples 112–127 are similar to the process of Example 3.
Examples 128–132 are similar to the process of Example 2.
In Table 10, these three polymers were used: A = 65 BA/35 MMA/0.08 n-DDM; B = 50 BA/50 MMA/0.08 n-DDM and C = 65 BA/35 MMA/0.1 n-DDM.
*Monomers after double slash (//) were charged to monomer emulsion after rod-shaped particles were observed.
Neutralizer was TEA in all Examples except 143 where NaOH and Lime were added to TEA, and in 145 where KOH was used.
Examples 133–138, 141–145 and 150–152 were run according to the process of Example 2.
Examples 139–140 were run according to the process of Example 3.
Examples 146–149 and 151 were run according to the process of Example 6.

Example 154

This example shows that rod-shaped latex particles can also prepared from an acid soluble resin.

Preparation of Acid Soluble Resin (DMAEMA-Containing Resin)

A 5 liter, four-necked flask equipped with a mechanical stirrer, nitrogen sparge, thermocouple and condenser was charged with 360 grams of water and 13 grams of Triton X-405. The mixture was heated at 40° C., and 75 grams of methyl methacrylate as well as 6 grams of n-DDM were added. Twenty minutes later, 75 grams of dimethylaminoethyl methacrylate was added. Subsequently, a mixture of 10 grams of ferrous sulfate solution (0.1%) and 10 grams of versene solution (1%) was added as promoter. To the kettle was then added 1.5 grams of TBHP in 15 grams of water, followed by one gram of isoascorbic acid dissolved in 20 grams of water. A twenty degree temperature increase was observed within ten minutes of reaction. When the kettle temperature reached its maximum (60° C.), a chaser couple, 1 gram of TBHP in 10 grams of water and 0.7 grams of Formopon dissolved in 10 grams of water were added to complete the polymerization. The resulting polymer contained 24.7% total solids and 0.664 meq. amine per gram.

Preparation of Rod-Shaped Polymer Particles

Part of above emulsion polymer (200 g), diluted with 100 grams of water was charged to a 5 liter four-necked flask and heated at 70° C. To the kettle was then added 12 grams of propionic acid to solubilize the stabilizer, and a mixture of 10 grams of ferrous sulfate solution (0.1% active) and 10 grams of versene solution (1% active). Subsequently, three feeds, a monomer emulsion containing 300 grams of water, 20 grams of Triton X-100, 100 grams of butyl acrylate and 400 grams of vinyl acetate, an initiator containing 1.5 grams of TBHP and 1.5 grams of APS dissolved in 60 grams of water, and a reducing agent containing 2 grams of sodium bisulfite dissolved in 60 grams of water, were cofed into the kettle over a period of one hour while the kettle temperature was maintained at 72° C. Thirty minutes after the feeds, a chaser couple, one gram of TBHP in 5 grams of water and 0.7 grams of Formopon dissolved in 10 grams of water, were added to chase the residual monomers. The resulting latex had total solids of 45.9% and rod-shaped particles of 1 micron in diameter and 3–12 microns in length.

Examples 155–164

In the Examples 155 to 164 processes were run in a manner similar to Example 154 except that the acid-soluble resin composition, neutralizer, use level, and co-surfactant were altered as shown in Table 11. As shown in Table 11, various types of acid can be used to neutralize DMAEMA-containing resin which then offered rod-shaped latex particles. The formation of rod-shaped particles in the DMAEMA-containing ASR depended significantly on the stabilizer composition and hydrophobic and hydrophilic balancing, as was seen with the MAA containing ASRs.

TABLE 11

| Example | Polymer Composition | Kettle Charge | Neut. | ME Soap & Additive | Shape and Size of Particles (microns) |
|---|---|---|---|---|---|
| ASR: 50 MMA/50 DMAEMA (4.0 nDDM) | | | | | |
| 155 | 20 BA/80 VAc | 10 ASR | PPA | 0.8 Conco AAS | rods: 1 × 15–90 |
| 156 | 20 BA/80 VAc | 10 ASR | TTA[2] | 0.8 Conco AAS | rods: 10–15 × 35–140 (40%); Spheres, 10 (60%) |
| 157 | 20 BA/80 VAc | 10 ASR | HMPA[3] | 0.8 Conco AAS | rods: 2 × 20–140 (30%); Spheres, 10 (70%) |
| 158 | 20 BA/80 VAc | 10 ASR | HCl | 0.8 Conco AAS | rods: 1 × 3–15 (50%); Spheres, 3 (50%) |
| 159 | 20 BA/80 VAc | 10 ASR | PPA | none | rods: 0.7 × 60–70 |
| 160 | 50 BA/50 VAc | 10 ASR | PPA | 4.0 Triton X-100 | rods: 1 × 3–6 |
| 161 | 60 BA/40 MMA | 10 ASR | PPA | 4.0 Triton X-100 | rod: 0.8 × 8–10 |
| 162 | 98 BA/2 MAA | 6 ASR | PPA | 4.0 Triton X-100 | rod: 1 × 12–40 |
| ASR: 40 MMA/60 DMAEMA (4.0 n-DDM) | | | | | |
| 163 | 20 BA/80 VAc | 10 ASR | PPA | 0.8 Conco AAS | mostly spheres, ~1; some rods |
| ASR: 10 BA/30 MMA/60 DMAEAM (4.0 nDDM) | | | | | |

TABLE 11-continued

| Example | Polymer Composition | Kettle Charge | Neut. | ME Soap & Additive | Shape and Size of Particles (microns) |
|---|---|---|---|---|---|
| 164 | 20 BA/80 VAc | 10 ASR | PPA | none | rods: 1 × 15–50 |

[1] PPA: propionic acid
[2] TTA: tartaric acid
[3] HMPA: 2,2-bis(hydroxymethyl)-propionic acid Example 165

The ASR was prepared in the presence of polyvinyl alcohol by one-shot emulsion polymerization. The ASR was solubilized by aqueous ammonia and used as the stabilizer.

| | |
|---|---|
| Stabilizer: | 1% PVOH/12% ASR |
| PVOH: | Airvol 203 |
| ASR: | 32 BA/35 MMA/33 MAA (4.3 n-DDM) |
| Polymer: | 65 BA/35 MMA (0.5 n-DDM) |

Examples 166–172

Process as Example 165 except that PVOH, ASR and polymer compositions were altered as indicated in Table 12.

Table 12 shows the effect of PVOH on rod-shaped particles. The presence of PVOH does influence the rod size; shorter rods are produced when PVOH is present. Grafting partially hydrolyzed (88%) PVOH to the ASR also aids in stabilizing the resulting polymer to sedimentation and syneresis.

TABLE 12

| Example | % PVOH | 1st stage (ASR) Composition | ASR | 2nd Stage Composition | Shape and Size of Particles (microns) |
|---|---|---|---|---|---|
| 166 | 1 Airvol 203 | 32 BA/35 MMA/33 MAA/4.3 n-DDM | 12 | 65 BA/35 MMA/0.5 n-DDM | rod: 0.5 × 10 |
| 167 | " | 32 BA/35 MMA/33 MAA/4.3 n-DDM | 12 | 65 BA/35 MMA | rod: 0.6 × 30–40 |
| 168 | " | 66.7 MMA/33.3 MAA/4.3 n-DDM | 12 | 65 BA/35 MMA/0.3 n-DDM | rod: 0.7 × 10–15 |
| 169 | – | 66.7 MMA/33.3 MAA/4.3 n-DDM | 12 | 65 BA/35 MMA/0.3 n-DDM | rod: 0.8 × 15–25 |
| 170 | 1 Airvol 205 | 66.7 MMA/33.3 MAA/4.3 n-DDM | 12 | 65 BA/35 MMA/0.3 n-DDM | rod: 0.8 × 35 |
| 171 | 1 Airvol 523 | 66.7 MMA/33.3 MAA/4.3 n-DDM | 12 | 65 BA/35 MMA/0.3 n-DDM | rod: 0.5 × 10 |
| 172 | 1 Airvol 203 | 66.7 MMA/33.3 MAA/4.3 n-DDM | 12 | 65 BA/30 MMA/5 GMA | rod: 0.3 × 4 |

A 5 liter, four-necked flask equipped with a mechanical stirrer, nitrogen sparge, thermocouple and condenser was charged with 345 grams of water, 5 grams of Airvol 203 (polyvinyl alcohol) and 0.2 grams of Alipal CO-436. The mixture was heated at 80° C., and monomers, 19 grams of butyl acrylate, 21 grams of methyl methacrylate, 20 grams of methacrylic acid, and 2.6 grams of a chain transfer agent, 1-dodecanethiol, were added and mixed well. Subsequently, a free radical initiator, 0.5 gram of APS dissolved in 5 grams of water was added to the flask. The monomer-containing mixture was held at 80° C. for approximately fifteen minutes. After completion of the polymerization, 14 grams of aqueous ammonia (26 weight %) was added to neutralize (solubilize) the stabilizer. Thus, a clear polymer solution was obtained.

Three feeds containing a second monomer emulsion comprising 325 grams of butyl acrylate, 175 grams of methyl methacrylate, 2.5 grams of n-dodecanethiol, 1.8 grams of Conco AAS-60S, 14.5 grams of Triton X-165, and 250 grams of water, an initiator, 1.0 gram of APS and 1.5 grams of TBHP dissolved in 100 grams of water, and a reducing agent, 1.8 grams of sodium bisulfite in 100 grams of water were then slowly cofed to the above neutralized polymer over a period of one hour. Mild heat was applied to the flask so that the kettle temperature was maintained at 70° C. The solution was held at 70° C. for fifteen minutes after end of feeds and then cooled to 60° C. A chaser couple, 1.0 gram of TBHP in 10 grams of water and 0.7 gram of Formopon dissolved in 15 grams of water were added thereafter. Fifteen minutes later, the polymer was cooled to ambient temperature. The resulting polymer had negligible amounts of gel, 39.9% of non-volatiles, 650 cps of Brookfield viscosity and rod-shaped particles, 0.5 microns in diameter, 10 microns in length.

Example 173

This example shows that one can convert fine spherical latex particles (<50 nm) to bigger size particles (~300 nm) by post treating the fine particles with a salt of an ASR. However, no large spheres (>1 micron) or rod-shaped particles were obtained by this route. Therefore, incorporation of ASR molecule to particles in the beginning stage of polymerization appears to be critical for the rod or large spherical particles formation.

Process

A 5 liter, four-necked flask equipped with a mechanical stirrer, nitrogen sparge, thermocouple and condenser was charged with 200 grams of water, 50 grams of sodium lauryl sulfate (28 percent active), 2.7 grams of triethanolamine and heated at 80° C. To the kettle was added a mixture of 10 grams of ferrous sulfate solution (0.1%) and 10 grams of versene (1%). Subsequently, three feeds, (1) a monomer emulsion comprising 300 grams of water, 6.5 grams of Conco AAS-60S (60% active), 325 grams of butyl acrylate, 175 grams of methyl methacrylate and 1.0 gram of n-dodecanethiol, (2) an initiator, 1.5 grams of TBHP and 1.5 grams of APS dissolved in 50 grams of water and (3) a reducing agent containing 2 grams of sodium bisulfite dissolved in 50 grams of water, were cored into the kettle over a period of one hour while the kettle temperature was maintained at 80° C. The resulting polymer contained fine spherical particles (~36 nm). To the resulting polymer was then added a triethanolamine (5 grams dissolved in 20 grams of water) neutralized ASR (40 grams of 25.2% total solids of 33.3 BA/33.3 MMA/33.3 MAA/4.5 tert-DDM composition ASR which was prepared by the method described in Example 1). Immediately after the addition of ASR, the kettle polymer became chalky and had 293 nm size of spherical particles.

Example 174

Filtration of high Tg, large spherical latex particles.

To filter a latex, a Buchner funnel was used in conjunction with a suction flask, into which it was fitted by means of a rubber stopper; the flask was attached by means of thick-walled rubber tubing to a water suction pump. A grade 230 filter paper from Whatman Inc., Clifton, N.J., was placed onto the top of Buchner funnel. The latex was then filtered through with the aid of vacuum. The fines and water soluble stabilizers were collected in the flitrate. The high Tg, large spherical latex particles were collected on the top of the filter paper. A latex polymer (34 BA/60 Sty/4 EA/2 ALMA) was prepared by the process described in Example 6. The resulting latex was passed through a Buchner funnel with the aid of vacuum. A non-sticky, flowable, white powder (368 g. ~73% yield) was collected on the top of filter paper. The redispersed powder had spherical particle sizes of 23–32 microns.

Example 175

This example shows that one can convert rod-shaped particles to large spherical particles by swelling the rod-shaped particles with either excess monomers or solvents.

A 65 BA/35 MMA/0.1 n-DDM composition rod-shaped latex was prepared from an ASR (65 MMA/35 MAA/4.5 n-DDM) as described in Example 4. The resulting latex had 32% of total solids and rod-shaped particles (0.8 microns in diameter and 50–70 microns in length). To 20 grams of this rod-shaped latex was added 20 grams 1,3-butylene glycol dimethacrylate. The mixture was initiated with TBHP/SSF and stirred for 12 hours. The particles obtained were 4 to 6 microns spherical particles.

In another experiment, 17 grams hexane was mixed with 20 grams of rod-shaped latex and stirred for 12 hours. The resulting latex had 3 to 5 microns spherical particles.

Example 176–178

The following samples (Table 13) shows that rod-shaped latex containing hydroxy functional group can be prepared by partial hydrolysis of a vinyl acetate/acrylic copolymer with sodium hydroxide.

TABLE 13

| Example | Base Polymer | ASR Composition | Vinyl Alcohol Content* |
|---|---|---|---|
| 176 | 20 BA/80 VAc | 7.5% 50 MMA/50 DMAEMA | 36% |
| 177 | 20 EA/80 VAc | 7.5% 50 MMA/50 DMAEMA | 32% |
| 178 | 20 MA/80 VAc | 7.5% 50 MMA/50 DMAEMA | 54% |

*Mole % based on polymer composition

The emulsion polymers were prepared in a manner similar to Example 154. The resulting polymers had a total solids of 44%. The rod-shaped latexes were then hydrolyzed with NaOH. To 100 grams of VAc/acrylate copolymer which contains 0.4 mole of vinyl acetate was added 12 grams Triton X-405, 10 grams 28% ammonia and 0.1 to 0.4 moles of 16.5% sodium hydroxide solution. The mixture was heated in an oven at 60° overnight. Sample 178 contained fewer rods than 176 and 177, which may be due to increased solubility of the higher polyvinyl alcohol-content in that sample.

Example 179–181

Another approach to prepare rod-shaped particle latex containing hydroxyl group is to add hydroxyethyl methacrylate (HEMA) as a shell on a BA/MMA rod polymer (Example 181) or to post-add HEMA to monomer emulsion after rod formation (Example 179 and 180).

TABLE 14

| | | Particles Containing —OH Group | |
|---|---|---|---|
| Ex. | Stabilizer | Polymer Group | Morphology |
| 179 | 2 (33 BA/27 MMA/40 MAA) 1 SLS | 33 (68 BA/32 MMA)/ 67 (67 BA/30 MMA/3 HEMA) | Rods: 1 × 30 $\mu$m |
| 180 | 3 (33 BA/27 MMA/40 MAA) 1 SLS | 25 (50 BA/50 MMA)/ 75 (50 BA/46.5 MMA/2.0 AM/ 1.5 HEMA) | Rods: 5 × (10–30) |
| 181 | 11.5 (33 BA/27 MMA/40 MAA) | 39.5 BA/59.5 MMA/1 ALMA/ /5 HEMA | Rods: 1 × (25–50) and 2 × (10–30) |

The procedure for preparing ASR was similar to Example 1, except that the composition was altered as shown in Table 14. The rod-shaped latex particles were prepared in a manner similar to Example 2 using a premade ASR. In Example 179 and 180, HEMA was added to monomer emulsion after the formation of rod-shaped particles. In Example 181, HEMA was added in a single charge to a premade, rod-shaped polymer to form a shell.

Example 182–183

Table 15 (Examples 182 and 183) shows that polymerization process has an effect on the polymer morphology. Rod-shaped particles were obtained when the polymer was prepared using a gradual addition process. On the other hand, multishot process generated a latex with large spherical particles.

TABLE 15

| Process Effect ASR: 33 BA/33 MMA/34 MAA (2.7 MMP) Emulsion Polymer: 65 BA/35 MMA | | |
|---|---|---|
| Example | Process | Morphology |
| 182 | Gradual addition | Rod, 2 × 100 $\mu$m |
| 183 | Multi-shot | Sphere, 11–14 $\mu$m |

Example 182 was run in a manner similar to Example 3 except for n-dodecanthiol which was replaced by methyl mercaptopropionate in the stabilizer (ASR). The resulting polymer had a total solids of 36.6% and particle size of 2×100 $\mu$m.

The ASR of Example 183 was prepared in the same way as Example 182 ASR. The emulsion polymer was prepared by a shot process instead of gradual addition process as in Example 182. The monomer emulsion was divided into four parts (10/20/35/35) and each shots were polymerized at 60° C. with a redox initiator. The resulting polymer had a total solids of 35.8% and particle size of 11–14 μm.

Applications Data

Polymers prepared according to the invention were evaluated in end use applications. The polymers provided improved performance in reducing a phenomenon known as mud-cracking in films and in burnish resistance.

All Formulations list ingredients in order of addition. In Formulations A and C, the grind portion of the formula is all the ingredients up to, but not including, the binder (Formulation A, the binder is UCAR 367 (Union Carbide Chemicals and Plastics), Formulation C the binder is Rhoplex AC-490 (Rohm and Haas Company). Example 2 does not have a pigment grind.

| Material | Composition | ASR Level | Shape and Size |
|---|---|---|---|
| 184 | 60 BA/40 MMA | 2% | 2 × 80μ Rod |
| 185 | 20 BA/80 VAc | 10% | 1 × 3 to 12μ Rod (DMAEMA ASR) |
| 186 | 30 BA/70 MMA | 12% | 10μ Sphere |
| 187 | 20 BA/80 VAc | 6% | 4 to 7μ Sphere |
| 188 | 20 BA/80 Sty | 2% | 6 to 14μ Sphere |

Process Notes:
Ex 184 was prepared according to a process similar to Ex. 111; Ex. 185 was prepared according to a process similar to Ex. 155; Ex. 186 was prepared according to a process similar to Ex. 47; Ex. 187 was prepared according to a process similar to Ex. 145; Ex. 188 was prepared according to a process similar to Ex. 116.

FORMULATION A
Mud Cracking - Interior Flat Wall Paint -
Acrylic and Vinyl Acetate Rod Particles

| Materials | Control | Acrylic Rod) | Vinyl Acetate Rod |
|---|---|---|---|
| Water | 176.2 | 176.2 | 176.2 |
| Ethylene Glycol | 27.6 | 27.6 | 27.6 |
| Tamol | 7.7 | 7.7 | 7.7 |
| AMP-95 | 2.0 | 2.0 | 2.0 |
| Colloid 643 | 2.0 | 2.0 | 2.0 |
| 250 MHR (2.5%) | 70.0 | 70.0 | 70.0 |
| Acrysol RM-825 | 14.1 | 14.1 | 14.1 |
| Ti-Pure R-900 | 153.4 | 153.4 | 153.4 |
| Optiwhite P | 247.5 | 247.5 | 247.5 |
| Nyad 400 | 42.9 | 42.9 | 42.9 |
| Ucar 367 | 252.9 | 187.5 | 190.8 |
| Ex. 184 | 0.0 | 86.5 | 0.0 |
| Ex. 185 | 0.0 | 0.0 | 74.8 |
| Texanol | 5.1 | 5.1 | 5.1 |
| Colloid 643 | 4.0 | 4.0 | 4.0 |
| Nuosept 95 | 1.0 | 1.0 | 1.0 |
| NH4OH (28%) | 0.0 | 0.0 | 2.8 |
| Water | 129.0 | 105.8 | 113.7 |
| Total | 1135.4 | 1133.3 | 1135.6 |
| PVC | 58.1 | 58.1 | 58.1 |
| Volume Solids | 34.2 | 34.2 | 34.2 |

| Example | Control | 184 | 185 |
|---|---|---|---|
| Mud Cracking | 4.2 | 7.4 | 9.8 |

Mud Cracking Test Method

Paints are drawn down over unsealed wallboard at 30 mil wet film using a multiple film caster, dried for 24 hours in a constant temperature/humidity room (77 Degrees/50% Relative Humidity) and visually rated for mud cracking using a scale of 0 (poor) to 10 (excellent).

FORMULATION B
Flatting of Clear Wood Varnish-Acrylic Large Spherical Particle

| Materials | Control | Acrylic Sphere |
|---|---|---|
| Rhoplex CL-104 | 540.0 | 410.1 |
| Sancure 815 | 148.5 | 148.5 |
| Surfynol 104PG-50 | 3.0 | 3.0 |
| Tego 800 | 0.7 | 0.7 |
| Propylene Glycol | 30.0 | 30.0 |
| Hexyl Carbitol | 20.8 | 0.0 |
| Dowanol PnB | 0.0 | 20.8 |
| Michem 39235 | 22.4 | 22.4 |
| Water | 76.3 | 106.1 |
| Aqueous Ammonia | 2.5 | 2.5 |
| Ex. 186 Concentrate* | 0.0 | 88.7 |
| Acrysol Rm-1020 | 18.0 | 24.0 |
| Total | 862.2 | 856.8 |
| Volume Solids | 28.6 | 28.6 |

*Note that the material referred to as "186 Concentrate" was prepared by allowing the 186 dispersion, described above to settle overnight, then decanting the liquid portion off. The concentrate is the remaining sediment and is easily dispersed into the formulation. This process removes the smaller (<0.7μ) particles ("fines") from the large spherical particles.

| Example | Control | 186 |
|---|---|---|
| Gloss, 20 Degree | 62.9 | 2.9 |
| Gloss, 60 Degree | 88.5 | 13.9 |
| Gloss, 85 Degree | 102.4 | 12.8 |

Flat Test Method

Apply three coats by brush on a stained white pine wood board. Dry 24 hours between coats. Light sand between coats. Allow third coat to dry for 24 hours before measuring gloss. Measure gloss at 20, 60 and 85 degrees.

FORMULATION C
Burnish Resistance Interior Sheet Paint -
Acrylic and Vinyl Acetate Spheres

| Materials | Control | Acrylic Sphere | Vinyl Acetate Sphere |
|---|---|---|---|
| Tamol 731 | 11.0 | 10.6 | 10.6 |
| Colloid 643 | 2.0 | 2.0 | 2.0 |
| Propylene Glycol | 43.0 | 43.0 | 43.0 |
| Water | 50.0 | 50.0 | 50.0 |
| Ti-Pure R-900 | 234.5 | 234.5 | 234.5 |
| Atomite | 36.2 | 36.2 | 36.2 |
| Celite 281 | 69.2 | 0.0 | 0.0 |
| AC-490 | 370.8 | 374.1 | 374.1 |
| Propylene Glycol | 34.4 | 34.4 | 34.4 |
| Texanol | 17.0 | 17.0 | 17.0 |
| Colloid 643 | 4.0 | 4.0 | 4.0 |
| Nuosept 95 | 2.0 | 2.0 | 2.0 |
| Ex. 188 | 0.0 | 71.0 | 0.0 |
| Ex. 187 | 0.0 | 0.0 | 86.2 |
| 2.5% HEC Solution | 159.2 | 159.2 | 159.2 |
| Water | 60.0 | 21.2 | 8.6 |
| Total | 1093.3 | 1059.3 | 1061.8 |
| PVC | 40.0 | 40.0 | 40.0 |
| Volume Solids | 30.0 | 30.0 | 30.0 |
| Celite 281 PVC | 12.0 | | |
| Ex. 188 PVC | | 12.0 | |
| Ex. 187 PVC | | | 12.0 |

| Example | Control | 188 | 187 |
|---|---|---|---|
| Gloss Change (%) | 77 | 10 | 5 |

Burnish Resistance reported as % change in 85 degree gloss. The lower the value, the better the burnish resistance.

We claim:

1. An emulsion polymerization process for preparing emulsion polymer particles, comprising:
    polymerizing at least one ethylenically unsaturated monomer in an aqueous medium in the presence of:
    i) from about 0.5 to about 50 weight percent, based on the total monomer reactants and optional organic additive, of a substantially water-insoluble amphiphilic polymeric stabilizer selected from the group consisting of hydrophobic-hydrophilic balanced alkaline soluble resins and hydrophobic-hydrophilic balanced acid soluble resins,
    ii) an amount of a neutralizer compound effective to render the substantially water-insoluble amphiphilic polymeric stabilizer soluble in the aqueous medium, wherein said neutralizer compound is selected from the group consisting of organic bases, inorganic bases, organic acids and inorganic acids, and
    iii) a free radical polymerization initiator; wherein the monomer is introduced into the aqueous medium in a controlled manner under conditions which favor the continued solubility of the amphiphilic polymeric stabilizer.

2. A process according to claim 1 wherein the emulsion polymer particles are high aspect ratio emulsion polymer latexes that exhibit an aspect ratio greater than or equal to about 3.

3. A process according to claim 1 wherein the emulsion polymer particles are large spherical emulsion polymer particles of from 2 to 50 microns in diameter.

4. A process according to claim 1 wherein the polymeric stabilizer is an alkali-soluble resin containing from about 5 to about 75 weight percent acid-functional monomer and having a molecular weight greater than 1,000.

5. A process according to claim 1 wherein the polymeric stabilizer is an a acid-soluble resin containing from about 20 to about 70 weight percent alkali-functional monomer and having a molecular weight greater than 1,000.

6. A process according to claim 1 wherein the organic additive is present and is selected from the group consisting of hydrophobic alcohols which contain from 6 to 18 carbon atoms, surfactants, polyvinyl alcohols and coalescent agent.

7. A high aspect ratio emulsion polymer latex particle made by the process of claim 2, wherein the ethylenically unsaturated monomer comprises an ethylenically unsaturated site and further comprises a functional group.

8. A high aspect ratio emulsion polymer particle according to claim 7 wherein the functional group is selected from the group consisting of amine, hydroxyl, acetoacetyl, N-alkanolamido, oxirane and acid.

9. A polymer particle made by the process of claim 1, wherein the polymer is crosslinked.

10. A process for producing high aspect ratio carbon particles comprising forming high aspect ratio polymer particles according to the process of claim 2 and then pyrolyzing the polymer particles to form high aspect ratio carbon particles.

11. A coating with a pigment volume concentration near or above the critical pigment volume concentration having improved mud-cracking resistance on porous substrates comprising pigment, binder and high aspect ratio polymer particles made according to claim 2.

12. A joint cement containing high aspect ratio particles prepared according to claim 2.

13. A process for preparing spherical emulsion polymer particles comprising preparing high aspect ratio polymer particles according to claim 2 and adding an amount of solvent or additional monomer effective to swell the particles and cause the high aspect ratio polymers to change shape into spherical particles.

14. A coating comprising polymer binder and large spherical particles prepared according to claim 3.

15. A coating comprising polymer binder and high aspect ratio particles prepared according to claim 2.

16. A thermoplastic molding composition containing large spherical particles prepared according to claim 3.

17. A thermoplastic molding composition containing high aspect ratio particles prepared according to claim 2.

18. A joint cement containing large spherical particles prepared according to claim 3.

19. A cementitious composition having improved flexural strength comprising inorganic materials and high aspect ratio particles prepared according to claim 2.

20. Spherical emulsion polymer particles having a diameter of from 2 to 50 microns prepared according to the process of claim 1.

21. A reinforcing additive for coating, molding or potting compositions comprising the product of claim 1.

22. The process of claim 1, wherein the monomer is introduced into the aqueous medium as a continuous stream.

23. The process of claim 1, wherein the amphiphilic polymeric stabilizer is formed in the aqueous medium by emulsion polymerization of a monomer mixture comprising an ethylenically unsaturated acid-functional monomer or an ethylenically unsaturated alkali-functional monomer prior to introduction of the at least one ethylenically unsaturated monomer.

* * * * *

UNITED STATES PATENT AND TRADEMARK OFFICE
CERTIFICATE OF CORRECTION

PATENT NO. : 5,369,163

DATED : November 29, 1994

INVENTOR(S) : S. J. Chiou, M. L. Sheng, J. W. Hook III, T. E. Stevens

It is certified that error appears in the above-indentified patent and that said Letters Patent is hereby corrected as shown below:

Column 14, line 66 "3 Grad-Add thermal; in situ" should read --4 One-shot thermal; in-situ--

Column 21, line 45, "92.4 mmp)" should read --(2.4 mmp)--

Column 26, line 24 in Example 169, "65 BA" should read --65 EA--

Column 26, line 25 in Example 170 "65 BA" should read --65 EA--

Column 26, line 26 in Example 171 "65 BA" should read --65 EA--

Column 26, line 27 in Example 172 "65 BA" should read --65 EA--

Column 29, line 42 "Tamol" should read --Tamol 850--

Column 30, line 40 "Sheet" should read --sheen--

Signed and Sealed this

Second Day of May, 1995

BRUCE LEHMAN

Attest:

*Attesting Officer*     *Commissioner of Patents and Trademarks*